US012772264B2

(12) United States Patent
Van Der Zee et al.

(10) Patent No.: US 12,772,264 B2
(45) Date of Patent: Oct. 20, 2026

(54) COMMUNICATION DEVICE POWER SAVING WHEN COMMUNICATION DEVICE MONITORS MULTICAST CONTROL CHANNEL NOTIFICATION CHANNEL

(71) Applicant: Telefonaktiebolaget LM Ericsson (publ), Stockholm (SE)

(72) Inventors: Martin Van Der Zee, Malmö (SE); Ali Nader, Malmö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 340 days.

(21) Appl. No.: 18/285,127

(22) PCT Filed: Mar. 31, 2022

(86) PCT No.: PCT/IB2022/053025
§ 371 (c)(1),
(2) Date: Sep. 29, 2023

(87) PCT Pub. No.: WO2022/208435
PCT Pub. Date: Oct. 6, 2022

(65) Prior Publication Data

US 2024/0107559 A1 Mar. 28, 2024

Related U.S. Application Data

(60) Provisional application No. 63/170,228, filed on Apr. 2, 2021.

(51) Int. Cl.
*H04W 72/30* (2023.01)
*H04W 52/02* (2009.01)
(Continued)

(52) U.S. Cl.
CPC ....... *H04W 72/30* (2023.01); *H04W 52/0206* (2013.01); *H04W 72/232* (2023.01); *H04W 76/20* (2018.02)

(58) Field of Classification Search
CPC ......... H04W 52/0206; H04W 52/0229; H04W 72/232; H04W 72/30; H04W 76/20
See application file for complete search history.

(56) References Cited

U.S. PATENT DOCUMENTS 9,769,628 B2 * 9/2017 Kim ........................ H04W 4/06
10,743,146 B2 * 8/2020 Li ........................... H04W 4/06
(Continued)

FOREIGN PATENT DOCUMENTS

EP 2466977 A1 6/2012
WO 2017045188 A1 3/2017
WO 2020089466 A1 5/2020

OTHER PUBLICATIONS

International Search Report and Written Opinion of the International Searching Authority, PCT/IB2022/053025, mailed Jun. 23, 2022, 12 pages.
(Continued)

*Primary Examiner* — Eric Nowlin
(74) *Attorney, Agent, or Firm* — Sonoda & Kobayashi; Sarvajit S. Patil

(57) ABSTRACT

A communications network can include a communication device and a network node. The communication device can receive a notification message from the network node. The communication device can determine whether the network node will transmit control information that is associated with the communication device via a multicast control channel ("MCCH") based on the notification message. Responsive to determining that the network node will transmit the control information, the communication device can determine a time offset indicating an amount of time that will be between the notification message and the control information. Responsive to determining the time offset, the communica-
(Continued)

tion device can determine whether to enter a lower power state based on the time offset.

18 Claims, 19 Drawing Sheets

(51) Int. Cl.
*H04W 72/232* (2023.01)
*H04W 76/20* (2018.01)

(56) References Cited

U.S. PATENT DOCUMENTS 10,834,779 B2 * 11/2020 Shrivastava .......... H04W 76/28
11,234,189 B2 * 1/2022 Awoniyi-Oteri ...... H04W 80/08
11,350,347 B2 * 5/2022 Yavuz ................... H04W 72/23
11,622,239 B2 * 4/2023 Liu ....................... H04L 5/0094 370/312
11,785,543 B2 * 10/2023 Catovic ............. H04W 74/0808 370/318
2017/0127470 A1 * 5/2017 Vajapeyam ........... H04W 76/28
2019/0208570 A1 * 7/2019 Shrivastava .......... H04W 76/28
2020/0008130 A1 * 1/2020 Yavuz ................... H04W 48/16
2020/0154354 A1 * 5/2020 Awoniyi-Oteri ...... H04W 76/27
2021/0007049 A1 * 1/2021 Catovic ............. H04W 52/0274
2021/0136532 A1 * 5/2021 Liu ......................... H04W 4/06
2021/0400580 A1 * 12/2021 Maleki .............. H04W 52/0216
2022/0046564 A1 * 2/2022 Shimoda ........... H04W 56/0095
2022/0303902 A1 * 9/2022 Tao ................... H04W 72/0446
2022/0322291 A1 * 10/2022 Wang ....................... H04W 4/06
2022/0393957 A1 * 12/2022 Wang ................. H04B 7/18508
2023/0156434 A1 * 5/2023 Mohammed Mikaeil .................. H04W 72/0446 370/329
2023/0209485 A1 * 6/2023 Wei ................... H04W 56/0015 370/503
2023/0209645 A1 * 6/2023 Li ..................... H04W 52/0235 370/329
2024/0276243 A1 * 8/2024 Chen ..................... H04W 76/14

OTHER PUBLICATIONS

Oppo, "Potential paging enhancements," 3GPP TSG RAN WG1 #104-e, R1-2100168, e-Meeting, Jan. 25-Feb. 5, 2021, 4 pages.
Huawei et al., "WID revision: NR Multicast and Broadcast Services," 3GPP TSG RAN Meeting #88-e, RP-201038 'revision of RP-193248), E-meeting, Jun. 29-Jul. 3, 2020, 6 pages.

* cited by examiner

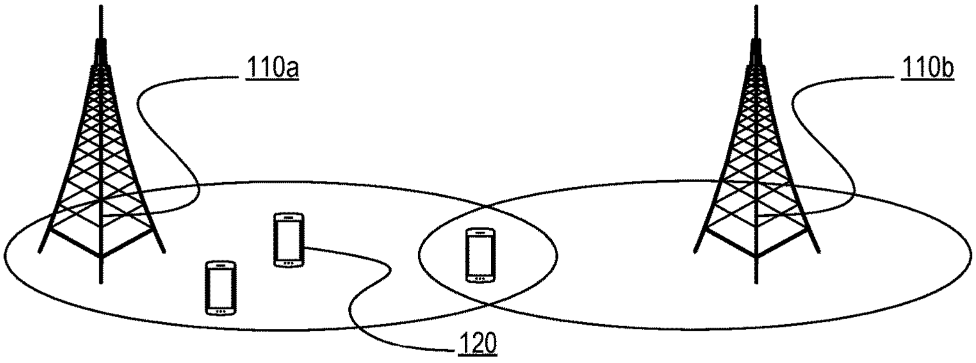

FIG. 1

| μ | $\Delta f = 2^{\mu} \cdot 15$ [kHz] | *Cyclic Prefix* |
|---|---|---|
| *0* | *15* | *Normal* |
| 1 | *30* | *Normal* |
| 2 | *60* | *Normal, Extended* |
| 3 | 120 | *Normal* |
| 4 | 240 | *Normal* |

FIG. 2

```
-- ASN1START
-- TAG-NZP-CSI-RS-RESOURCE-START

NZP-CSI-RS-Resource ::=             SEQUENCE {
    nzp-CSI-RS-ResourceId               NZP-CSI-RS-ResourceId,
    resourceMapping                     CSI-RS-ResourceMapping,
    powerControlOffset                  INTEGER (-8..15),
    powerControlOffsetSS                ENUMERATED{db-3, db0, db3, db6}
OPTIONAL,   -- Need R
    scramblingID                        ScramblingId,
    periodicityAndOffset                CSI-ResourcePeriodicityAndOffset
OPTIONAL,   -- Cond PeriodicOrSemiPersistent
    qcl-InfoPeriodicCSI-RS              TCI-StateId
OPTIONAL,   -- Cond Periodic
    ...
}

-- TAG-NZP-CSI-RS-RESOURCE-STOP
-- ASN1STOP
```

FIG. 3

| *NZP-CSI-RS-Resource field descriptions* |
|---|
| ***periodicityAndOffset***<br>Periodicity and slot offset *sl1* corresponds to a periodicity of 1 slot, *sl2* to a periodicity of two slots, and so on. The corresponding offset is also given in number of slots (see TS 38.214 [19], clause 5.2.2.3.1) |
| ***powerControlOffset***<br>Power offset of PDSCH RE to NZP CSI-RS RE. Value in dB (see TS 38.214 [19], clauses 5.2.2.3.1 and 4.1) |
| ***powerControlOffsetSS***<br>Power offset of NZP CSI-RS RE to SS RE. Value in dB (see TS 38.214 [19], clause 5.2.2.3.1) |
| ***qcl-InfoPeriodicCSI-RS***<br>For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in *tci-StatesToAddModList* in the *PDSCH-Config* included in the *BWP-Downlink* corresponding to the serving cell and to the DL BWP to which the resource belongs to (see TS 38.214 [19], clause 5.2.2.3.1) |
| ***resourceMapping***<br>OFDM symbol location(s) in a slot and subcarrier occupancy in a PRB of the CSI-RS resource |
| ***scramblingID***<br>Scrambling ID (see TS 38.214 [19], clause 5.2.2.3.1) |

FIG. 4

| Conditional Presence | Explanation |
|---|---|
| Periodic | The field is optionally present, Need M, for periodic NZP-CSI-RS-Resources (as indicated in CSI-ResourceConfig). The field is absent otherwise |
| PeriodicOrSemiPersistent | The field is mandatory present, Need M, for periodic and semi-persistent NZP-CSI-RS-Resources (as indicated in CSI-ResourceConfig). The field is absent otherwise. |

FIG. 5

```
-- ASN1START
-- TAG-NZP-CSI-RS-RESOURCEID-START

NZP-CSI-RS-ResourceId ::=           INTEGER (0..maxNrofNZP-CSI-RS-Resources-1)

-- TAG-NZP-CSI-RS-RESOURCEID-STOP
-- ASN1STOP
```

FIG. 6

```
-- ASN1START
-- TAG-NZP-CSI-RS-RESOURCESET-START
NZP-CSI-RS-ResourceSet ::=          SEQUENCE {
    nzp-CSI-ResourceSetId               NZP-CSI-RS-ResourceSetId,
    nzp-CSI-RS-Resources                SEQUENCE (SIZE (1..maxNrofNZP-CSI-RS-ResourcesPerSet)) OF
NZP-CSI-RS-ResourceId,
    repetition                          ENUMERATED { on, off }
OPTIONAL,   -- Need S
    aperiodicTriggeringOffset           INTEGER(0..6)
OPTIONAL,   -- Need S
    trs-Info                            ENUMERATED {true}
OPTIONAL,   -- Need R
    ...
}

-- TAG-NZP-CSI-RS-RESOURCESET-STOP
-- ASN1STOP
```

FIG. 7

| ***NZP-CSI-RS-ResourceSet field descriptions*** |
|---|
| ***aperiodicTriggeringOffset***<br>*Offset X between the slot containing the DCI that triggers a set of aperiodic NZP CSI-RS resources and the slot in which the CSI-RS resource set is transmitted. The value 0 corresponds to 0 slots, value 1 corresponds to 1 slot, value 2 corresponds to 2 slots, value 3 corresponds to 3 slots, value 4 corresponds to 4 slots, value 5 corresponds to 16 slots, value 6 corresponds to 24 slots. When the field is absent the UE applies the value 0* |
| ***nzp-CSI-RS-Resources***<br>*NZP-CSI-RS-Resources associated with this NZP-CSI-RS resource set (see TS 38.214 [19], clause 5.2). For CSI, there are at most 8 NZP CSI RS resources per resource set* |
| ***repetition***<br>*Indicates whether repetition is on/off. If the field is set to 'OFF' or if the field is absent, the UE may not assume that the NZP-CSI-RS resources within the resource set are transmitted with the same downlink spatial domain transmission filter and with same NrofPorts in every symbol (see TS 38.214 [19], clauses 5.2.2.3.1 and 5.1.6.1.2). Can only be configured for CSI-RS resource sets which are associated with CSI-ReportConfig with report of L1 RSRP or "no report"* |
| ***qcl-InfoPeriodicCSI-RS***<br>*For a target periodic CSI-RS, contains a reference to one TCI-State in TCI-States for providing the QCL source and QCL type. For periodic CSI-RS, the source can be SSB or another periodic-CSI-RS. Refers to the TCI-State which has this value for tci-StateId and is defined in tci-StatesToAddModList in the PDSCH-Config included in the BWP-Downlink corresponding to the serving cell and to the DL BWP to which the resource belongs to (see TS 38.214 [19], clause 5.2.2.3.1)* |
| ***trs-Info***<br>*Indicates that the antenna port for all NZP-CSI-RS resources in the CSI-RS resource set is same. If the field is absent or released the UE applies the value "false" (see TS 38.214 [19], clause 5.2.2.3.1).* |

FIG. 8

```
-- ASN1START
-- TAG-NZP-CSI-RS-RESOURCESETID-START

NZP-CSI-RS-ResourceSetId ::=        INTEGER (0..maxNrofNZP-CSI-RS-ResourceSets-1)

-- TAG-NZP-CSI-RS-RESOURCESETID-STOP
-- ASN1STOP
```

FIG. 9

```
-- ASN1START
-- TAG-CSI-RESOURCECONFIG-START

CSI-ResourceConfig ::=      SEQUENCE {
    csi-ResourceConfigId        CSI-ResourceConfigId,
    csi-RS-ResourceSetList      CHOICE {
        nzp-CSI-RS-SSB              SEQUENCE {
            nzp-CSI-RS-ResourceSetList  SEQUENCE (SIZE (1..maxNrofNZP-CSI-RS-
ResourceSetsPerConfig)) OF NZP-CSI-RS-ResourceSetId

OPTIONAL, -- Need R
            csi-SSB-ResourceSetList     SEQUENCE (SIZE (1..maxNrofCSI-SSB-ResourceSetsPerConfig))
OF CSI-SSB-ResourceSetId

OPTIONAL  -- Need R
        },
        csi-IM-ResourceSetList      SEQUENCE (SIZE (1..maxNrofCSI-IM-ResourceSetsPerConfig)) OF
CSI-IM-ResourceSetId
    },

    bwp-Id                      BWP-Id,
    resourceType                ENUMERATED { aperiodic, semiPersistent, periodic },
    ...
}

-- TAG-CSI-RESOURCECONFIG-STOP
-- ASN1STOP
```

FIG. 10

| CSI-ResourceConfig field descriptions |
|---|
| **bwp-Id**<br>The DL BWP which the CSI-RS associated with this CSI-ResourceConfig are located in (see TS 38.214 [19], clause 5.2.1.2 |
| **csi-ResourceConfigId**<br>Used in CSI-ReportConfig to refer to an instance of CSI-ResourceConfig |
| **csi-RS-ResourceSetList**<br>Contains up to maxNrofNZP-CSI-RS-ResourceSetsPerConfig resource sets if ResourceConfigType is 'aperiodic' and 1 otherwise (see TS 38.214 [19], clause 5.2.1.2) |
| **csi-SSB-ResourceSetList**<br>List of SSB resources used for beam measurement and reporting in a resource set (see TS 38.214 [19], section FFS_Section) |
| **resourceType**<br>Time domain behavior of resource configuration (see TS 38.214 [19], clause 5.2.1.2). It does not apply to resources provided in the csi-SSB-ResourceSetList. |

FIG. 11

```
-- ASN1START
-- TAG-CSI-RESOURCECONFIGID-START

CSI-ResourceConfigId ::=            INTEGER (0..maxNrofCSI-ResourceConfigurations-1)

-- TAG-CSI-RESOURCECONFIGID-STOP
-- ASN1STOP
```

FIG. 12

```
-- ASN1START
-- TAG-CSI-RESOURCEPERIODICITYANDOFFSET-START

CSI-ResourcePeriodicityAndOffset ::=    CHOICE {
    slots4                              INTEGER (0..3),
    slots5                              INTEGER (0..4),
    slots8                              INTEGER (0..7),
    slots10                             INTEGER (0..9),
    slots16                             INTEGER (0..15),
    slots20                             INTEGER (0..19),
    slots32                             INTEGER (0..31),
    slots40                             INTEGER (0..39),
    slots64                             INTEGER (0..63),
    slots80                             INTEGER (0..79),
    slots160                            INTEGER (0..159),
    slots320                            INTEGER (0..319),
    slots640                            INTEGER (0..639)
}

-- TAG-CSI-RESOURCEPERIODICITYANDOFFSET-STOP
-- ASN1STOP
```

FIG. 13

```
-- ASN1START
-- TAG-CSI-RS-RESOURCECONFIGMOBILITY-START

CSI-RS-ResourceConfigMobility ::=   SEQUENCE {
    subcarrierSpacing                   SubcarrierSpacing,
    csi-RS-CellList-Mobility            SEQUENCE (SIZE (1..maxNrofCSI-RS-CellsRRM)) OF CSI-RS-
CellMobility,
    ... ,
    [[
    refServCellIndex-v1530              ServCellIndex
OPTIONAL    -- Need S
    ]]


}

CSI-RS-CellMobility ::=             SEQUENCE {
    cellId                              PhysCellId,
    csi-rs-MeasurementBW                SEQUENCE {
        nrofPRBs                            ENUMERATED { size24, size48, size96, size192,
size264},
        startPRB                            INTEGER(0..2169)
    },
    density                             ENUMERATED {d1,d3}
OPTIONAL,   -- Need R
    csi-rs-ResourceList-Mobility        SEQUENCE (SIZE (1..maxNrofCSI-RS-ResourcesRRM)) OF CSI-RS-
Resource-Mobility
}

CSI-RS-Resource-Mobility ::=        SEQUENCE {
    csi-RS-Index                        CSI-RS-Index,
    slotConfig                          CHOICE {
        ms4                                 INTEGER (0..31),
        ms5                                 INTEGER (0..39),
        ms10                                INTEGER (0..79),
        ms20                                INTEGER (0..159),
        ms40                                INTEGER (0..319)
    },
    associatedSSB                       SEQUENCE {
        ssb-Index                           SSB-Index,
        isQuasiColocated                    BOOLEAN
    }
OPTIONAL, -- Need R
    frequencyDomainAllocation           CHOICE {
        row1                                BIT STRING (SIZE (4)),
        row2                                BIT STRING (SIZE (12))
    },
    firstOFDMSymbolInTimeDomain         INTEGER (0..13),
    sequenceGenerationConfig            INTEGER (0..1023),
    ...
}

CSI-RS-Index ::=                    INTEGER (0..maxNrofCSI-RS-ResourcesRRM-1)

-- TAG-CSI-RS-RESOURCECONFIGMOBILITY-STOP
-- ASN1STOP
```

FIG. 14

| ***CSI-RS-CellMobility field descriptions*** |
|---|
| ***csi-rs-ResourceList-Mobility***<br>List of CSI-RS resources for mobility. The maximum number of CSI-RS resources that can be configured per frequency layer depends on the configuration of *associatedSSB* (see TS 38.214 [19], clause 5.1.6.1.3). |
| ***density***<br>Frequency domain density for the 1-port CSI-RS for L3 mobility Corresponds to L1 parameter 'Density' (see FFS_Spec, section FFS_Section). |
| ***nrofPRBs***<br>Allowed size of the measurement BW in PRBs Corresponds to L1 parameter 'CSI-RS-measurementBW-size' (see FFS_Spec, section FFS_Section). |
| ***startPRB***<br>Starting PRB index of the measurement bandwidth Corresponds to L1 parameter 'CSI-RS-measurement-BW-start' (see FFS_Spec, section FFS_Section) FFS_Value: Upper edge of value range unclear in RAN1. |

FIG. 15

| **CSI-RS-ResourceConfigMobility field descriptions** |
|---|
| **csi-RS-CellList-Mobility**<br>List of cells |
| **refServCellIndex**<br>Indicates the serving cell providing the timing reference for CSI-RS resources without associatedSSB. The field may be present only if there is at least one CSI-RS resource configured without associatedSSB. In case there is at least one CSI-RS resource configured without associatedSSB and this field is absent, the UE shall use the timing of the PCell. The CSI-RS resources and the serving cell indicated by refServCellIndex for timing reference should be located in the same band. |
| **subcarrierSpacing**<br>Subcarrier spacing of CSI-RS. Only the values 15, 30 or 60 kHz (<6GHz), 60 or 120 kHz (>6GHz) are applicable. |

FIG. 16

| ***CSI-RS-Resource-Mobility* field descriptions** |
|---|
| ***associatedSSB***<br>If this field is present, the UE may base the timing of the CSI-RS resource indicated in *CSI-RS-Resource-Mobility* on the timing of the cell indicated by the *cellId* in the *CSI-RS-CellMobility*. In this case, the UE is not required to monitor that CSI-RS resource if the UE cannot detect the SS/PBCH block indicated by this *associatedSSB* and *cellId*. If this field is absent, the UE shall base the timing of the CSI-RS resource indicated in *CSI-RS-Resource-Mobility* on the timing of the serving cell indicated by *refServCellIndex*. In this case, the UE is required to measure the CSI-RS resource even if SS/PBCH block(s) with *cellId* in the *CSI-RS-CellMobility* are not detected.<br>CSI-RS resources with and without *associatedSSB* may be configured in accordance with the rules in TS 38.214 [19], clause 5.1.6.1.3. |
| ***csi-RS-Index***<br>CSI-RS resource index associated to the CSI-RS resource to be measured (and used for reporting). |
| ***firstOFDMSymbolInTimeDomain***<br>Time domain allocation within a physical resource block. The field indicates the first OFDM symbol in the PRB used for CSI-RS, see TS 38.211 [16], clause 7.4.1.5.3. Value 2 is supported only when DL-DMRS-typeA-pos equals 3. |
| ***frequencyDomainAllocation***<br>Frequency domain allocation within a physical resource block in accordance with TS 38.211 [16], clause 7.4.1.5.3 including table 7.4.1.5.2-1. The number of bits that may be set to one depend on the chosen row in that table. For the choice "other", the row can be determined from the parameters below and from the number of bits set to 1 in frequencyDomainAllocation. |
| ***isQuasiColocated***<br>The CSI-RS resource is either QCL'ed not QCL'ed with the associated SSB in spatial parameters (see TS 38.214 [19], clause 5.1.6.1.3. |
| ***sequenceGenerationConfig***<br>Scrambling ID for CSI-RS (see TS 38.211 [16], clause 7.4.1.5.2). |
| ***slotConfig***<br>Indicates the CSI-RS periodicity (in milliseconds) and for each periodicity the offset (in number of slots). When subcarrierSpacingCSI-RS is set to 15kHZ, the maximum offset values for periodicities ms4/ms5/ms10/ms20/ms40 are 3/4/9/19/39 slots. When subcarrierSpacingCSI-RS is set to 30kHZ, the maximum offset values for periodicities ms4/ms5/ms10/ms20/ms40 are 7/9/19/39/79 slots. When subcarrierSpacingCSI-RS is set to 60kHZ, the maximum offset values for periodicities ms4/ms5/ms10/ms20/ms40 are 15/19/39/79/159 slots. When subcarrierSpacingCSI-RS is set 120kHZ, the maximum offset values for periodicities ms4/ms5/ms10/ms20/ms40 are 31/39/79/159/319 slots. |

FIG. 17

```
-- ASN1START
-- TAG-CSI-RS-RESOURCEMAPPING-START

CSI-RS-ResourceMapping ::=          SEQUENCE {
    frequencyDomainAllocation           CHOICE {
        row1                                BIT STRING (SIZE (4)),
        row2                                BIT STRING (SIZE (12)),
        row4                                BIT STRING (SIZE (3)),
        other                               BIT STRING (SIZE (6))
    },
    nrofPorts                           ENUMERATED {p1,p2,p4,p8,p12,p16,p24,p32},
    firstOFDMSymbolInTimeDomain         INTEGER (0..13),
    firstOFDMSymbolInTimeDomain2        INTEGER (2..12)
OPTIONAL,   -- Need R
    cdm-Type                            ENUMERATED {noCDM, fd-CDM2, cdm4-FD2-TD2, cdm8-FD2-TD4},
    density                             CHOICE {
        dot5                                ENUMERATED {evenPRBs, oddPRBs},
        one                                 NULL,
        three                               NULL,
        spare                               NULL
    },
    freqBand                            CSI-FrequencyOccupation,
    ...
}

-- TAG-CSI-RS-RESOURCEMAPPING-STOP
-- ASN1STOP
```

FIG. 18

| ***CSI-RS-ResourceMapping field descriptions*** |
|---|
| ***cdm-Type***<br>*CDM type (see TS 38.214 [19], clause 5.2.2.3.1).* |
| ***density***<br>*Density of CSI-RS resource measured in RE/port/PRB (see TS 38.211 [16], clause 7.4.1.5.3).*<br>*Values 0.5 (dot5), 1 (one) and 3 (three) are allowed for X=1, values 0.5 (dot5) and 1 (one) are allowed for X=2, 16, 24 and 32, value 1 (one) is allowed for X=4, 8, 12.*<br>*For density = 1/2, includes 1-bit indication for RB level comb offset indicating whether odd or even RBs are occupied by CSI-RS.* |
| ***firstOFDMSymbolInTimeDomain2***<br>*Time domain allocation within a physical resource block. See TS 38.211 [16], clause 7.4.1.5.3.* |
| ***firstOFDMSymbolInTimeDomain***<br>*Time domain allocation within a physical resource block. The field indicates the first OFDM symbol in the PRB used for CSI-RS. See TS 38.211 [16], clause 7.4.1.5.3. Value 2 is supported only when DL-DMRS-typeA-pos equals 3.* |
| ***freqBand***<br>*Wideband or partial band CSI-RS, (see TS 38.214 [19], clause 5.2.2.3.1)* |
| ***frequencyDomainAllocation***<br>*Frequency domain allocation within a physical resource block in accordance with TS 38.211 [16], clause 7.4.1.5.3. The applicable row number in table 7.4.1.5.3-1 is determined by the frequencyDomainAllocation for rows 1, 2 and 4, and for other rows by matching the values in the column Ports, Density and CDMtype in table 7.4.1.5.3-1 with the values of nrofPorts, cdm-Type and density below and, when more than one row has the 3 values matching, by selecting the row where the column (k bar, l bar) in table 7.4.1.5.3-1 has indexes for k ranging from 0 to 2*n-1 where n is the number of bits set to 1 in frequencyDomainAllocation.* |
| ***nrofPorts***<br>*Number of ports (see TS 38.214 [19], clause 5.2.2.3.1)* |

FIG. 19

COMMUNICATION DEVICE POWER SAVING WHEN COMMUNICATION DEVICE MONITORS MULTICAST CONTROL CHANNEL NOTIFICATION CHANNEL

CROSS REFERENCE TO RELATED APPLICATIONS

This application is a 35 U.S.C. § 371 national stage application of PCT International Application No. PCT/IB2022/053025 filed on Mar. 31, 2022, which in turn claims domestic priority to U.S. Provisional Patent Application No. 63/170,228, filed on Apr. 2, 2021, the disclosures and content of which are incorporated by reference herein in their entirety.

TECHNICAL FIELD

The present disclosure relates generally to communications, and more particularly to communication methods and related devices and nodes.

BACKGROUND

FIG. 1 illustrates an example of a 5th Generation ("5G") network (also referred to as a new radio ("NR") network) including a pair of network nodes 110*a-b* (e.g., 5G base stations ("gNB")) and multiple communication devices 120 (also referred to as user equipment ("UE")).

There is a Rel-17 work item to introduce Multicast and Broadcast Services ("MBS") in new radio ("NR")/5$^{th}$ generation ("5G"). For the design of MBS in NR the principles used for multimedia broadcast multicast service ("MBMS") and single cell point-to-multipoint ("SC-PTM") in long term evolution ("LTE") are evaluated and potentially re-used.

For example the multicast control channel ("MCCH") notification and control channel in SC-PTM is considered to be used in NR as well, to notify the broadcast UE in Idle and Inactive mode that a broadcast session is about to start (via the MCCH notification channel), and to inform the UE via the MCCH control channel, which broadcast sessions are active, and what the PTM configuration for each session is. The MCCH notification channel is one physical downlink control channel ("PDCCH") transmission scrambled with a SC-N radio network temporary identifier ("RNTI"). The MCCH control channel is a PDCCH transmission scrambled with SC-RNTI.

If the UE is interested to receive a particular broadcast session which is not active yet, the UE monitors the MCCH notification channel, and when it is indicated that a session is started, the UE has to check the MCCH control channel to see which session has started, and what PTM configuration is applicable for receiving the session.

For paging enhancements, a Paging Early Indication ("PE"I) signal is expected to be introduced in Rel-17. In the PEI the network indicates to the UE if the UE will be paged in the following Paging Occasion ("PO"). The UE requires less energy to wake up and monitor the (simple) PEI signal compared to the Paging PDCCH where the UE is paged, and in most cases the UE is not paged when waking up to monitor paging, thus the UE can save power.

UE power becomes more and more an important issue in both 3GPP standardization and 5G implementation.

SUMMARY

According to some embodiments, a communication device in a communications network that includes a network node is provided. The method includes receiving a notification message from the network node. The method further includes determining whether the network node will transmit control information that is associated with the communication device via a multicast control channel, MCCH, based on the notification message. The method further includes, responsive to determining that the network node will transmit the control information, determining a time offset indicating an amount of time that will be between the notification message and the control information. The method further includes, responsive to determining the time offset, determining whether to enter a lower power state based on the time offset According to other embodiments, a method of operating a network node in a communications network that includes a communication device is provided. The method includes determining a time offset indicating an amount of time that will be between a notification message transmitted to the communication device and control information transmitted via a multicast control channel, MCCH. The method further includes transmitting the notification message to the communication device indicating that the control information will be transmit via the MCCH.

According to other embodiments, a communication device, network node, computer program, and a computer program product can be provided for performing the above methods.

Various embodiments described herein reduce UE power consumption when the UE monitors the MCCH notification channel and gives the NW freedom to dynamically schedule MCCH at various occasions.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings:

FIG. 1 is a schematic diagram illustrating an example of a wireless communications network;

FIG. 2 is a table illustrating an example of supported transmission numerologies;

FIG. 3 is a diagram illustrating an example of a NZP-CSI-RS-Resource IE;

FIG. 4 is a table illustrating an example of NZP-CSI-RS-Resource field descriptions;

FIG. 5 is a table illustrating an example of conditional presences associated with NZP-CSI-RS-Resource 1E;

FIG. 6 is a diagram illustrating an example of a NZP-CSI-RS-ResourceId IE;

FIG. 7 is a diagram illustrating an example of a NZP-CSI-RS-ResourceSet IE;

FIG. 8 is a table illustrating an example of NZP-CSI-RS-ResourceSet field descriptions;

FIG. 9 is a diagram illustrating an example of a NZP-CSI-RS-ResourceSetId IE;

FIG. 10 is a diagram illustrating an example of a CSI-ResourceConfig IE;

FIG. 11 is a table illustrating an example of CSI-ResourceConfig field descriptions;

FIG. 12 is a diagram illustrating an example of CSI-ResourceConfigId IE;

FIG. 13 is a diagram illustrating an example of CSI-ResourcePeriodicityAndOffset IE;

FIG. 14 is a diagram illustrating an example of CSI-RS-ResourceConfigMobility IE;

FIG. 15 is a table illustrating an example of CSI-RS-CellMobility field descriptions;

FIG. 16 is a table illustrating an example of CSI-RS-ResourceConfigMobility field descriptions;

FIG. 17 is a table illustrating an example of CSI-RS-Mobility field descriptions;

FIG. 18 is a diagram illustrating an example of a CSI-RS-ResourceMapping IE;

FIG. 19 is a table illustrating an example of CSI-RS-ResourceMapping field descriptions;

DETAILED DESCRIPTION

Figure 20:
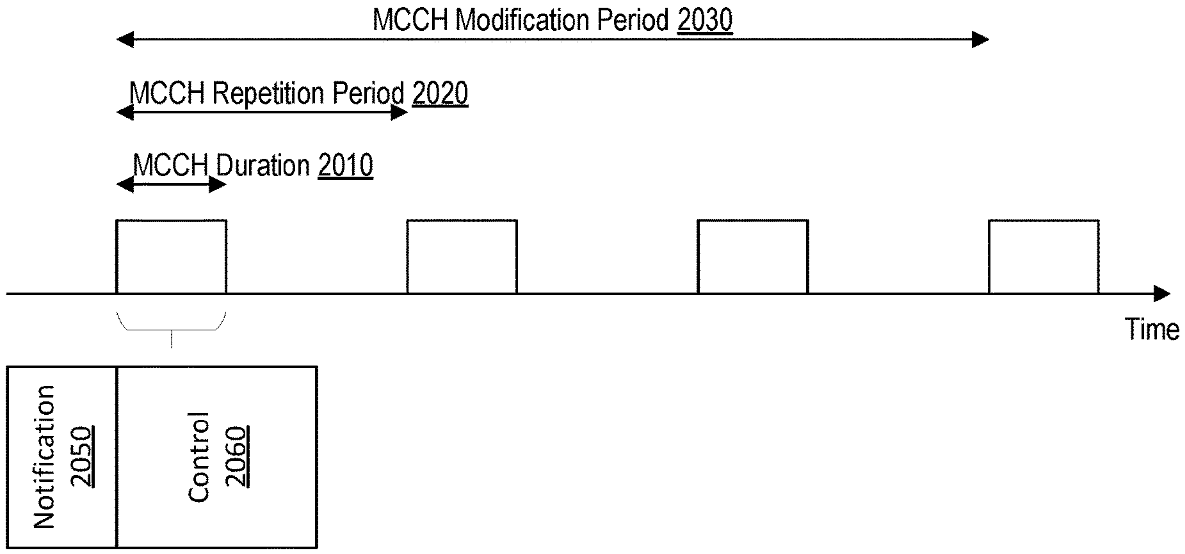
FIG. 20 is a block diagram illustrating an example of a MCCH scheduling without a time offset.

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of present inventive concepts to those skilled in the art. It should also be noted that these embodiments are not mutually exclusive. Components from one embodiment may be tacitly assumed to be present/used in another embodiment.

The following description presents various embodiments of the disclosed subject matter. These embodiments are presented as teaching examples and are not to be construed as limiting the scope of the disclosed subject matter. For example, certain details of the described embodiments may be modified, omitted, or expanded upon without departing from the scope of the described subject matter.

The Third Generation Partnership Project ("3GPP") is defining technical specifications for New Radio ("NR") (e.g., 5G). In release 15 (Rel-15) NR, a user equipment ("UE") can be configured with up to four carrier bandwidth parts ("BWPs") in the downlink with a single downlink carrier bandwidth part being active at a given time. A UE can be configured with up to four carrier bandwidth parts in the uplink with a single uplink carrier bandwidth part being active at a given time. If a UE is configured with a supplementary uplink, the UE can additionally be configured with up to four carrier bandwidth parts in the supplementary uplink with a single supplementary uplink carrier bandwidth part being active at a given time.

For a carrier bandwidth part with a given numerology $\mu_i$, a contiguous set of physical resource blocks ("PRBs") are defined and numbered from 0 to $$N_{BWP,i}^{size} - 1,$$

where i is the index of the carrier bandwidth part. A resource block ("RB") is defined as 12 consecutive subcarriers in the frequency domain.

Multiple orthogonal frequency-division multiplexing ("OFDM") numerologies, μ, are supported in NR as given by FIG. 2, where the subcarrier spacing, Δf, and the cyclic prefix for a carrier bandwidth part are configured by different higher layer parameters for downlink ("DL") and uplink ("UL"), respectively.

A downlink physical channel corresponds to a set of resource elements carrying information originating from higher layers. The following downlink physical channels are defined: Physical Downlink Shared Channel ("PDSCH"); Physical Broadcast Channel ("PBCH"); and Physical Downlink Control Channel ("PDCCH").

PDSCH is the main physical channel used for unicast downlink data transmission, but also for transmission of RAR (random access response), certain system information blocks, and paging information. PBCH carries the basic system information, required by the UE to access the network. PDCCH is used for transmitting downlink control information ("DCI"), mainly scheduling decisions, required for reception of PDSCH, and for uplink scheduling grants enabling transmission on PUSCH.

An uplink physical channel corresponds to a set of resource elements carrying information originating from higher layers. The following uplink physical channels are defined: Physical Uplink Shared Channel ("PUSCH"); Physical Uplink Control Channel ("PUCCH")' Physical Random Access Channel ("PRACH").

PUSCH is the uplink counterpart to the PDSCH. PUCCH is used by UEs to transmit uplink control information, including HARQ acknowledgements, channel state information reports, etc. PRACH is used for random access preamble transmission.

The ultra-lean design principle in NR aims to minimize the always-on transmissions that exist in earlier systems (e.g., LTE cell reference signal ("CRS") reference symbols). Instead, NR provides reference symbols such as SS blocks ("SSBs") on a periodic basis, by default once every 20 ms. In addition, for connected mode UEs, typically a set of reference symbols are provided for optimal link performance. Some of these reference symbols are clarified below.

A UE in RRC connected mode is expected to receive from the NW the RRC layer UE specific configuration of a NZP-CSI-RS-ResourceSet configured including the parameter trs-Info. For a NZP-CSI-RS-ResourceSet configured with the higher layer parameter trs-Info set to "true", the UE shall assume the antenna port with the same port index of the configured NZP CSI-RS resources in the NZP-CSI-RS-ResourceSet is the same.

For frequency range 1 ("FR1"), the UE may be configured with one or more NZP CSI-RS set(s), where a NZP-CSI-RS-ResourceSet consists of four periodic NZP CSI-RS resources in two consecutive slots with two periodic NZP CSI-RS resources in each slot. If no two consecutive slots are indicated as downlink slots by tdd-UL-DL-ConfigurationCommon or tdd-UL-DL-ConfigDedicated, then the UE may be configured with one or more NZP CSI-RS set(s), where a NZP-CSI-RS-ResourceSet consists of two periodic NZP CSI-RS resources in one slot.

For frequency range 2 ("FR2"), the UE may be configured with one or more NZP CSI-RS set(s), where a NZP-CSI-RS-ResourceSet consists of two periodic CSI-RS resources in one slot or with a NZP-CSI-RS-ResourceSet of four periodic NZP CSI-RS resources in two consecutive slots with two periodic NZP CSI-RS resources in each slot.

A UE configured with NZP-CSI-RS-ResourceSet(s) configured with higher layer parameter trs-Info may have the CSI-RS resources configured as: Periodic, with the CSI-RS resources in the NZP-CSI-RS-ResourceSet configured with same periodicity, bandwidth and subcarrier location; Periodic CSI-RS resource in one set and aperiodic CSI-RS resources in a second set, with the aperiodic CSI-RS and periodic CSI-RS resource having the same bandwidth (with same RB location) and the aperiodic CSI-RS being 'QCL-Type-A' and 'QCL-TypeD', where applicable, with the periodic CSI-RS resources. For frequency range 2, the UE does not expect that the scheduling offset between the last symbol of the PDCCH carrying the triggering DCI and the first symbol of the aperiodic CSI-RS resources is smaller than the UE reported ThresholdSched-Offset. The UE shall expect that the periodic CSI-RS resource set and aperiodic CSI-RS resource set are configured with the same number of CSI-RS resources and with the same number of CSI-RS resources in a slot. For the aperiodic CSI-RS resource set if triggered, and if the associated periodic CSI-RS resource set is configured with four periodic CSI-RS resources with two consecutive slots with two periodic CSI-RS resources in each slot, the higher layer parameter aperiodic TriggeringOffset indicates the triggering offset for the first slot for the first two CSI-RS resources in the set.

A UE does not expect to be configured with a CSI-ReportConfig that is linked to a CSI-ResourceConfig containing an NZP-CSI-RS-ResourceSet configured with trs-Info and with the CSI-ReportConfig configured with the higher layer parameter timeRestrictionForChannelMeasurements set to 'configured'.

A UE does not expect to be configured with a CSI-ReportConfig with the higher layer parameter reportQuantity set to other than 'none' for aperiodic NZP CSI-RS resource set configured with trs-Info.

A UE does not expect to be configured with a CSI-ReportConfig for periodic NZP CSI-RS resource set configured with trs-Info.

A UE does not expect to be configured with a NZP-CSI-RS-ResourceSet configured both with trs-Info and repetition.

Each CSI-RS resource, defined in Clause 7.4.1.5.3 of [4, TS 38.211], is configured by the higher layer parameter NZP-CSI-RS-Resource with the following restrictions.

The time-domain locations of the two CSI-RS resources in a slot, or of the four CSI-RS resources in two consecutive slots (which are the same across two consecutive slots), as defined by higher layer parameter CSI-RS-resourceMapping, is given by one of: 1) $l \in \{4,8\}$, $l \in \{5,9\}$ or $l \in \{6,10\}$ for frequency range 1 and frequency range 2; and 2) $l \in \{0,4\}$, $l \in \{1,5\}$, $l \in \{2,6\}$, $l \in \{3,7\}$, $l \in \{7,11\}$, $l \in \{8,12\}$ or $l \in \{9,13\}$ for frequency range 2.

A single port CSI-RS resource with density $\rho=3$ given by Table 7.4.1.5.3-1 from [4, TS 38.211] and higher layer parameter density configured by CSI-RS-ResourceMapping.

The bandwidth of the CSI-RS resource, as given by the higher layer parameter freqBand configured by CSI-RS-ResourceMapping, is the minimum of 52 and $$N_{BWP,i}^{size}$$

resource blocks, or is equal to $$N_{BWP,i}^{size}$$

resource blocks. For operation with shared spectrum channel access, freqBand configured by CSI-RS-ResourceMapping, is the minimum of 48 and $$N_{BWP,i}^{size}$$

resource blocks, or is equal to $$N_{BWP,i}^{size}$$

resource blocks.

The UE is not expected to be configured with the periodicity of $2^{\mu}\times10$ slots if the bandwidth of CSI-RS resource is larger than 52 resource blocks.

The periodicity and slot offset for periodic NZP CSI-RS resources, as given by the higher layer parameter periodicityAndOffset configured by NZP-CSI-RS-Resource, is one of $2^{\mu}X_p$ slots where $x_p$=10, 20, 40, or 80 and where $\mu$ is defined in Clause 4.3 of [4, TS 38.211].

Same powerControlOffset and powerControlOffsetSS given by NZP-CSI-RS-Resource value across all resources.

The UE can be configured with one or more NZP CSI-RS resource set configuration(s) as indicated by the higher layer parameters CSI-ResourceConfig, and NZP-CSI-RS-ResourceSet. Each NZP CSI-RS resource set consists of $K \leq 1$ NZP CSI-RS resource(s).

The following parameters for which the UE shall assume non-zero transmission power for CSI-RS resource are configured via the higher layer parameter NZP-CSI-RS-Resource, CSI-ResourceConfig and NZP-CSI-RS-ResourceSet for each CSI-RS resource configuration: nzp-CSI-RS-ResourceId determines CSI-RS resource configuration identity; periodicityAndOffset defines the CSI-RS periodicity and slot offset for periodic/semi-persistent CSI-RS. All the CSI-RS resources within one set are configured with the same periodicity, while the slot offset can be same or different for different CSI-RS resources; resourceMapping defines the number of ports, CDM-type, and OFDM symbol and sub-carrier occupancy of the CSI-RS resource within a slot that are given in Clause 7.4.1.5 of [4, TS 38.211]; nrofPorts in resourceMapping defines the number of CSI-RS ports, where the allowable values are given in Clause 7.4.1.5 of [4, TS 38.211]; density in resourceMapping defines CSI-RS frequency density of each CSI-RS port per PRB, and CSI-RS PRB offset in case of the density value of ½, where the allowable values are given in Clause 7.4.1.5 of [4, TS 38.211]. For density ½, the odd/even PRB allocation indicated in density is with respect to the common resource block grid; cdm-Type in resourceMapping defines CDM values and pattern, where the allowable values are given in Clause 7.4.1.5 of [4, TS 38.211]; powerControlOffset: which is the assumed ratio of PDSCH EPRE to NZP CSI-RS EPRE when UE derives CSI feedback and takes values in the range of [−8, 15] dB with 1 dB step size; powerControlOffsetSS: which is the assumed ratio of NZP CSI-RS EPRE to SS/PBCH block EPRE; scramblingID defines scrambling ID of CSI-RS with length of 10 bits; BWP-Id in CSI-ResourceConfig defines which bandwidth part the configured CSI-RS is located in; repetition in NZP-CSI-RS-ResourceSet is associated with a CSI-RS resource set and defines whether UE can assume the CSI-RS resources within the NZP CSI-RS Resource Set are transmitted with the same downlink spatial domain transmission filter or not as described in Clause 5.1.6.1.2. and can be configured only when the higher layer parameter reportQuantity associated with all the reporting settings linked with the CSI-RS resource set is set to ‘cri-RSRP’, ‘cri-SINR’ or ‘none’; qcl-InfoPeriodicCSI-RS contains a reference to a TCI-State indicating QCL source RS(s) and QCL type(s). If the TCI-State is configured with a reference to an RS with ‘QCL-TypeD’ association, that RS may be an SS/PBCH block located in the same or different CC/DL BWP or a CSI-RS resource configured as periodic located in the same or different CC/DL BWP; trs-Info in NZP-CSI-RS-ResourceSet is associated with a CSI-RS resource set and for which the UE can assume that the antenna port with the same port index of the configured NZP CSI-RS resources in the NZP-CSI-RS-ResourceSet is the same as described in Clause 5.1.6.1.1 and can be configured when reporting setting is not configured or when the higher layer parameter reportQuantity associated with all the reporting settings linked with the CSI-RS resource set is set to ‘none’.

All CSI-RS resources within one set are configured with same density and same nrofPorts, except for the NZP CSI-RS resources used for interference measurement.

The UE expects that all the CSI-RS resources of a resource set are configured with the same starting RB and number of RBs and the same cdm-type.

The bandwidth and initial common resource block (CRB) index of a CSI-RS resource within a BWP, as defined in Clause 7.4.1.5 of [4, TS 38.211], are determined based on the higher layer parameters nrofRBs and startingRB, respectively, within the CSI-FrequencyOccupation IE configured by the higher layer parameter freqBand within the CSI-RS-ResourceMapping IE. Both nrofRBs and startingRB are configured as integer multiples of 4 RBs, and the reference point for startingRB is CRB 0 on the common resource block grid. If startingRB $$< N_{BWP}^{start},$$

the UE shall assume that the initial CRB index of the CSI-RS resource is $$N_{initial\ RB} = N_{BWP}^{start},$$

otherwise $N_{initial\ RB}$=startingRB. If $$nrofRBs > N_{BWP}^{size} + N_{BWP}^{start} - N_{initial\ RB},$$

the UE shall assume that the bandwidth of the CSI-RS resource is $$N_{CSI-RS}^{BW} = N_{BWP}^{size} + N_{BWP}^{start} - N_{initial\ RB},$$

otherwise $$N_{CSI-RS}^{BW} = nrofRBs.$$

In all cases, the UE shall expect that $$N_{CSI-RS}^{BW} \geq \min\left(24, N_{BWP}^{size}\right).$$

FIG. 3 illustrates an example of a NZP-CSI-RS-Resource IE. The IE NZP-CSI-RS-Resource is used to configure Non-Zero-Power (NZP) CSI-RS transmitted in the cell where the IE is included, which the UE may be configured to measure on (see TS 38.214 [19], clause 5.2.2.3.1). FIG. 4 is a table illustrating an example of a NZP-CSI-RS-Resource filed descriptions. FIG. 5 is a table illustrating conditional presences associated with a NZP-CSI-RS-Resource IE.

FIG. 6 illustrates an example of a NZP-CSI-RS-ResourceId IE that is used to identify one NZP-CSI-RS-Resource.

FIG. 7 illustrates an example of a NZP-CSI-RS-ResourceSet IE that is a set of Non-Zero-Power (NZP) CSI-RS resources (their IDs) and set-specific parameters. FIG. 8 is a table illustrating an example of NZP-CSI-RS-ResourceSet field descriptions.

FIG. 9 illustrates an example of a NZP-CSI-RS-ResourceSetId IE that is used to identify one NZP-CSI-RS-ResourceSet.

FIG. 10 illustrates an example of a CSI-ResourceConfig IE that defines a group of one or more NZP-CSI-RS-ResourceSet, CSI-IM-ResourceSet and/or CSI-SSB-ResourceSet FIG. 11 is a table that illustrates an example of NZP-CSI-RS-ResourceConfig field descriptions.

FIG. 12 illustrates an example of a CSI-ResourceConfigId IE is used to identify a CSI-ResourceConfig.

FIG. 13 illustrates an example of a CSI-ResourcePeriodicityAndOffset IE that is used to configure a periodicity and a corresponding offset for periodic and semi-persistent CSI resources, and for periodic and semi-persistent reporting on PUCCH. both, the periodicity and the offset are given in number of slots. The periodicity value slots4 corresponds to 4 slots, slots5 corresponds to 5 slots, and so on.

FIG. 14 illustrates an example of a CSI-RS-ResourceConfigMobility IE that is used to configure CSI-RS based RRM measurements.

FIG. 15 illustrates an example of CSI-RS-CellMobility field descriptions.

FIG. 16 illustrates an example of CSI-RS-ResourceConfigMobility field descriptions.

FIG. 17 illustrates an example of CSI-RS-ResourceMobility field descriptions.

FIG. 18 illustrates an example of a CSI-RS-ResourceMapping IE that is used to configure the resource element mapping of a CSI-RS resource in time- and frequency domain. FIG. 19 illustrates an example of CSI-RS-ResourceMapping field descriptions.

In LTE the MCCH control info (including the broadcast PTM configuration) immediately follows the MCCH notification channel (where the start of the broadcast session is notified). And it is considered to re-use the LTE design in NR.

But in most cases when the UE wakes up to monitor the MCCH notification channel, the broadcast session is not started. During such events the UE should not be required to also receive the MCCH control info that immediately follows the MCCH notification transmission. But the UE implementation needs time to process the MCCH notification channel and decide if it needs to receive the following MCCH control information. And the UE implementation also needs time to prepare MCCH control information reception.

In case the notification channel indicates that the session has not started, the UE implementation may anyways try to receive the following MCCH control transmission, which is actually not transmitted. This leads to unnecessary UE power consumption. If there is more time between the MCCH notification channel and the MCCH control channel, the UE can avoid trying the receive the following PDSCH when there is no notification.

Various embodiments herein provide methods and mechanisms to enable power saving in the UE when it monitors the MCCH notification channel.

In some embodiments, a slot offset between MCCH notification and MCCH control channel is configured in SIB.

In additional or alternative embodiments, a Paging Early Indication (PEI)-alike signal is used and configured as MCCH notification channel, instead of a PDCCH scrambled with MCCH-RNTI. The PEI is configured with a slot offset to the start of the MCCH control channel.

In additional or alternative embodiments, multiple slot possible offsets are configured in the SIB, and the actual offset is pointed out by the notification. This gives NW flexibility to schedule the MCCH where feasible and at the same time help the UE to save power by dynamically pointing out where the relevant MCCH is.

In some embodiments, the NW has the freedom to schedule the MCCH where it is most suitable rather than always in the slot imminent to the notification. The NW aids the UE to point out where the MCCH is expected through an offset.

The notification may either be PDCCH-based signal or a sequenced-based signal. In the case of sequence-based, an SSS-alike or a CSI-RS/TRS (i.e. CSI-RS for tracking, see background chapter) signal is used. In case such sequence is detected by the UE, the UE know that it shall capture MCCH after the said offset. The UE may optionally use a low power receiver to decode the sequence-based notification which is more power efficient than a regular receiver that would otherwise be necessary for PDCCH decoding. The time/frequency resources for such sequence, i.e. on symbol level (time), subcarrier level (freq), and scrambling of the sequence is then also configured in a SIB so that the UE knows exactly which sequence to search for.

When the UE has to monitor MCCH notification channel to monitor the start of the broadcast session the UE power saving is reduced by: Giving the UE time to decide if it needs to receive the following MCCH control channel when monitoring the MCCH notification channel by introducing a configurable delay between transmission of MCCH notification and MCCH control info; and Instead of using a PDCCH based notification channel which is more power consuming for the UE to monitor, use a sequence-/reference signal-based (e.g. SSS or CSI/RS, or TRS-alike) notification channel.

An offset is conveyed to the UE informing the MCCH occasion relative to the received notification. This offset value is either: preconfigured and broadcast in a SIB acquired by the UE; preconfigured set of values and broadcast in a SIB. In one aspect different values per BWP (e.g. different BWPs with different subcarrier spacing may require different offsets). The UE would based on operating/active BWP use the offset configured for that BWP; or conveyed in the notification itself. Either the value itself or an index to a set (or array) of values configured in the SIB. If a sequence-based design is used for notification, different sequences are used to convey different offset values to the UE.

It may further be so that in a multi-beam deployment, the notification is repeated per beam (aka swept), in such case, there is an additional relation between each of the notification occasions and the corresponding MCCH instance. In one aspect the offset is relative the received notification whereas in another aspect the offset is relative plus an additional factor (e.g. offset+notification instance*time).

Various embodiments herein reduce UE power consumption when the UE monitors the MCCH notification channel. In some examples, the NW is given freedom to dynamically schedule MCCH at various occasions.

FIG. 20 is a block diagram illustrating an example of a MCCH scheduling without a time offset. A MCCH Duration 2010, a MCCH Repetition Period 2020, a MCCH Modification Period 2030, Notification 2050, and Control 2060 are illustrated. Notification 2050 refers to a first slot in a MCCH modification period, which carries the MCCH notification channel. Control 2060 refers to the MCCH control channel, which follows the slot carrying the MCCH notification channel.

Figure 21:
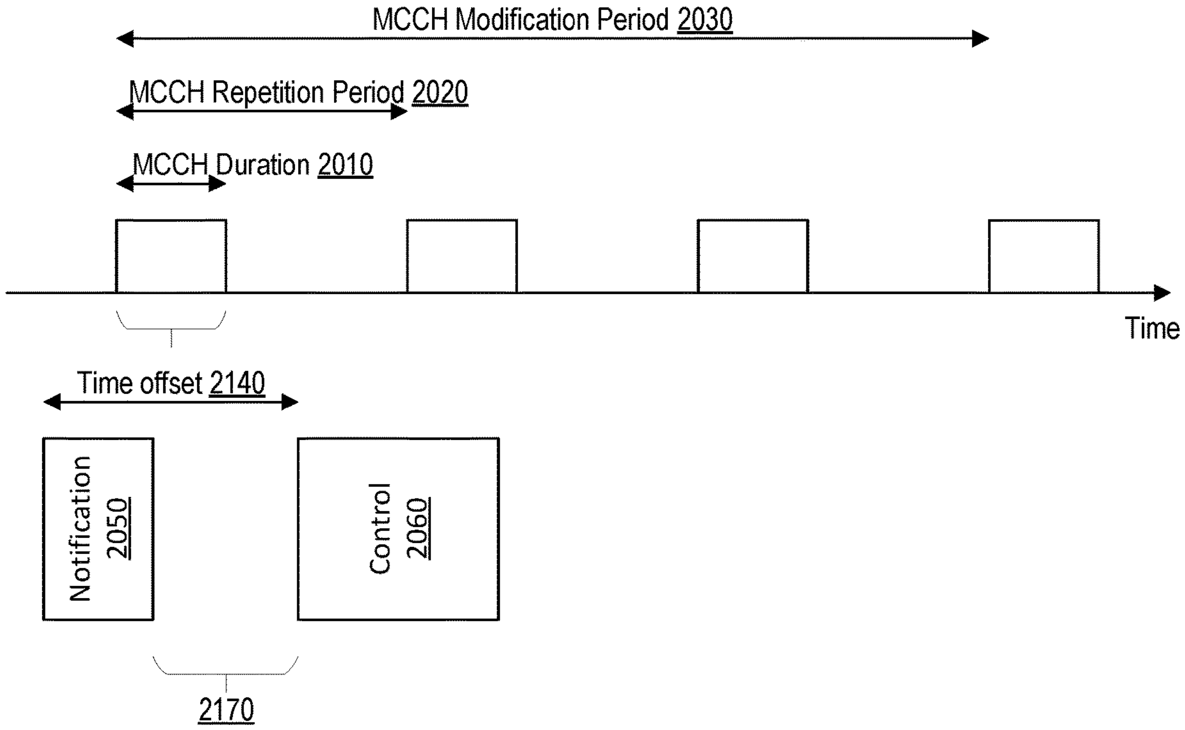
FIG. 21 is a block diagram illustrating an example of a MCCH scheduling with a time offset according to some embodiments of inventive concepts.

FIG. 21 is a block diagram illustrating an example of a MCCH scheduling with a time offset 2140 according to some embodiments of inventive concepts. Similar to FIG. 20, a MCCH Duration 2010, a MCCH Repetition Period 2020, a MCCH Modification Period 2030, Notification 2050, and Control 2060 are illustrated. Notification 2050 refers to a first slot in a MCCH modification period, which carries the MCCH notification channel. Control 2060 refers to the MCCH control channel, which follows the slot carrying the MCCH notification channel.

Time offset 2140 extends from the start of the Notification 2050 to the start of the Control 2060. Offset 2170 refers to a notification processing time and/or control preparation time between the Notification 2050 and Control 2060. In some examples, the notification channel 2050 indicates that the session is not started, and the UE should avoid receiving any MCCH control info.

Operations of a communication device (implemented using the structure of the block diagram of FIG. 24 will now be discussed with reference to the flow chart of FIG. 22 according to some embodiments of inventive concepts. For example, modules may be stored in memory 4130 of FIG. 24, and these modules may provide instructions so that when the instructions of a module are executed by respective communication device processing circuitry 4120, processing circuitry 4120 performs respective operations of the flow chart. Although FIG. 22 is described as being performed by communication device 4110, the operations therein can be performed by any suitable communication device, for example UE 4200 of FIG. 25, UEs 4491, 4492 of FIG. 27, and UE 4530 of FIG. 28.

Figure 22:
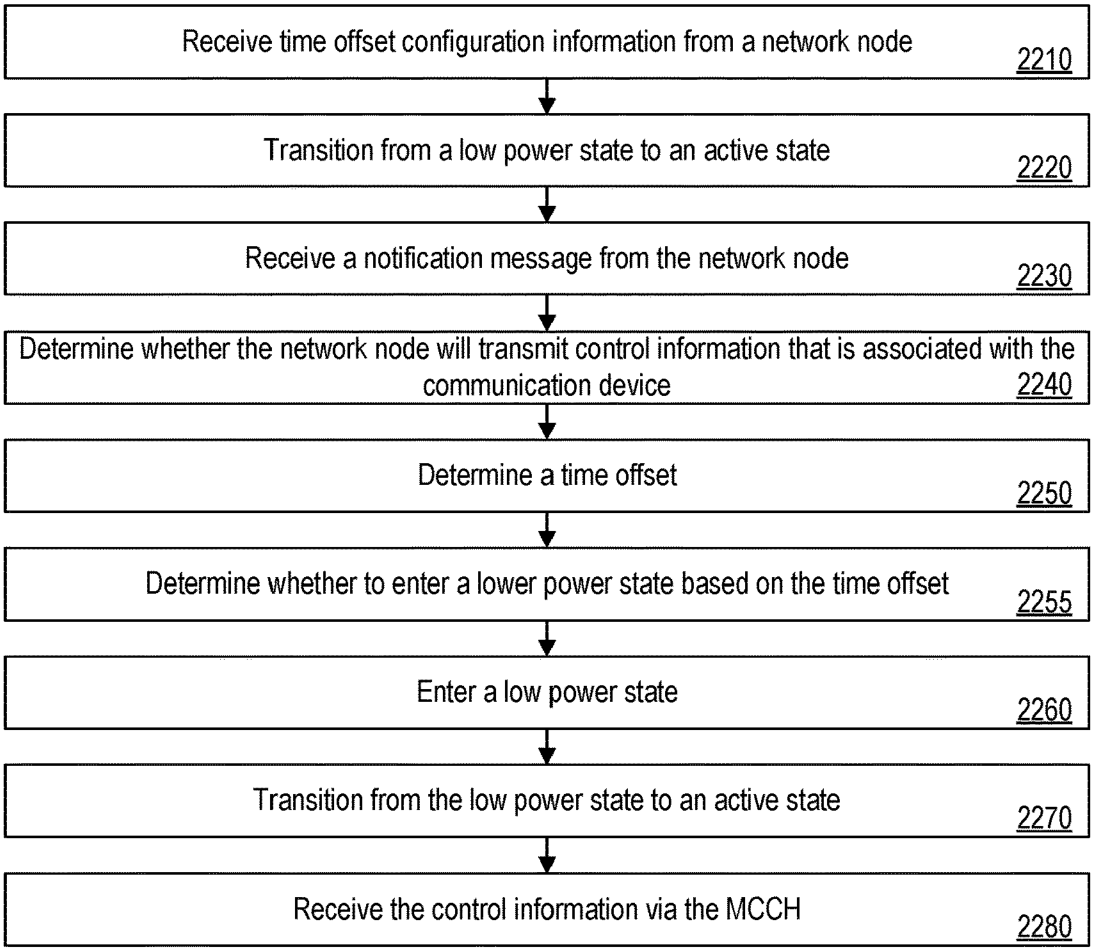
FIG. 22 is a flow chart illustrating examples of operations of a UE according to some embodiments of inventive concepts.

FIG. 22 illustrates an example of operations performed by a communication device in a communications network that includes a network node. At block 2210, processing circuitry 4120 receives, via transceiver 4114, time offset configuration information from the network node. In some embodiments, receiving the time offset configuration information includes receiving a system information block, SIB, from the network node including the time offset configuration information.

At block 2220, processing circuitry 4120 transitions from a lower power state to an active state. At block 2230, processing circuitry 4120 receives, via transceiver 4114, a notification message from the network node. At block 2240, processing circuitry 4120 determines whether the network node will transmit control information that is associated with the communication device. In some embodiments, processing circuitry 4120 determines whether the network node will transmit the control information via the MCCH based on the notification message.

At block 2250, processing circuitry 4120 determines a time offset. In some embodiments, determining the time offset includes determining the time offset based on the notification message. In additional or alternative embodiments, determining the time offset includes determining the time offset based on the time offset configuration information and the notification message.

In additional or alternative embodiments, receiving the time offset configuration information includes receiving a preconfigured time offset, and determining the time offset includes determining the time offset to be the preconfigured (e.g., predetermined) time offset.

At block 2255, processing circuitry 4120, determines whether to enter a lower power state based on the time offset. In some embodiments, determining whether to enter the lower power state comprises determining to enter the lower power state in response to determining that the time offset exceeds a predetermined threshold amount of time.

At block 2260, processing circuitry 4120 enters a low power state. At block 2170, processing circuitry 4120 transitions from the low power state to an active state. In some embodiments, processing circuitry 4120 transitions from the low power state to the active sate prior to the amount of time elapsing. At block 2280, processing circuitry 4120 receives, via transceiver 4114, the control information via the MCCH.

Various operations from the flow chart of FIG. 22 may be optional with respect to some embodiments of communication devices and related methods. In some examples, blocks 2210, 2220, 2260, 2270, and 2280 are optional Operations of a network node (implemented using the structure of the block diagram of FIG. 24 will now be discussed with reference to the flow chart of FIG. 23 according to some embodiments of inventive concepts. For example, modules may be stored in memory 4180 of FIG. 24, and these modules may provide instructions so that when the instructions of a module are executed by respective communication device processing circuitry 4170, processing circuitry 4170 performs respective operations of the flow chart. Although FIG. 23 is described as being performed by network node 4160, the operations therein can be performed by any suitable communication device, for example base station 4520 of FIG. 25 and base stations 4412*a-c* of FIG. 27.

Figure 23:
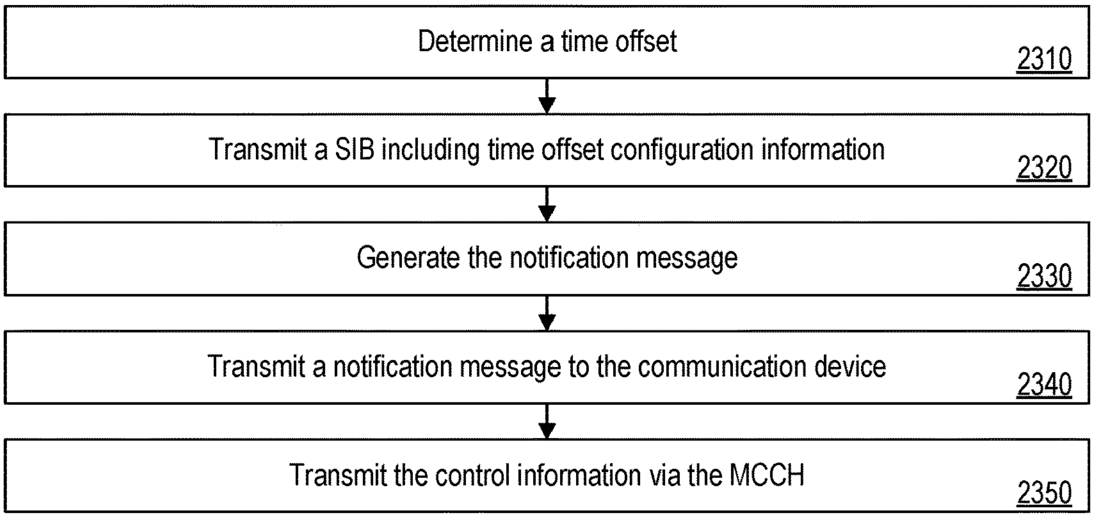
FIG. 23 is a flow chart illustrating examples of operations of a network node according to some embodiments of inventive concepts.

FIG. 23 illustrates an example of operations performed by a network node in a communications network that includes a communication device. At block 2310, processing circuitry 4170 determines a time offset. In some embodiments, the time offset indicates an amount of time that will be between a notification message transmitted to the communication device and control information transmitted via the MCCH. In additional or alternative embodiments, the time offset is a slot offset between the notification message and the control information.

At block 2320, processing circuitry 4170 transmits, via transceiver 4190, a SIB including time offset configuration information. In some embodiments, the time offset configuration information indicates how to determine the time offset.

At block 2330, processing circuitry 4170 generates the notification message. In some embodiments, the notification message is generated based on the time offset. The notification message can indicate that the control information will be transmit via the MCCH after the amount of time.

At block 2340, processing circuitry 4170 transmits, via transceiver 4190, a notification message to the communication device. In some embodiments, the notification message includes a physical downlink control channel, PDCCH, based signal or a sequence-based signal.

At block 2350, processing circuitry 4170 transmits, via transceiver 4190, control information via the MCCH. In some embodiments, the control information is transmitted in response to the amount of time having elapsed since transmitting the notification message.

Various operations from the flow chart of FIG. 23 may be optional with respect to some embodiments of communication devices and related methods. In some examples, blocks 2320, 2330, and 2350 are optional.

Additional explanation is provided below.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Figure 24:
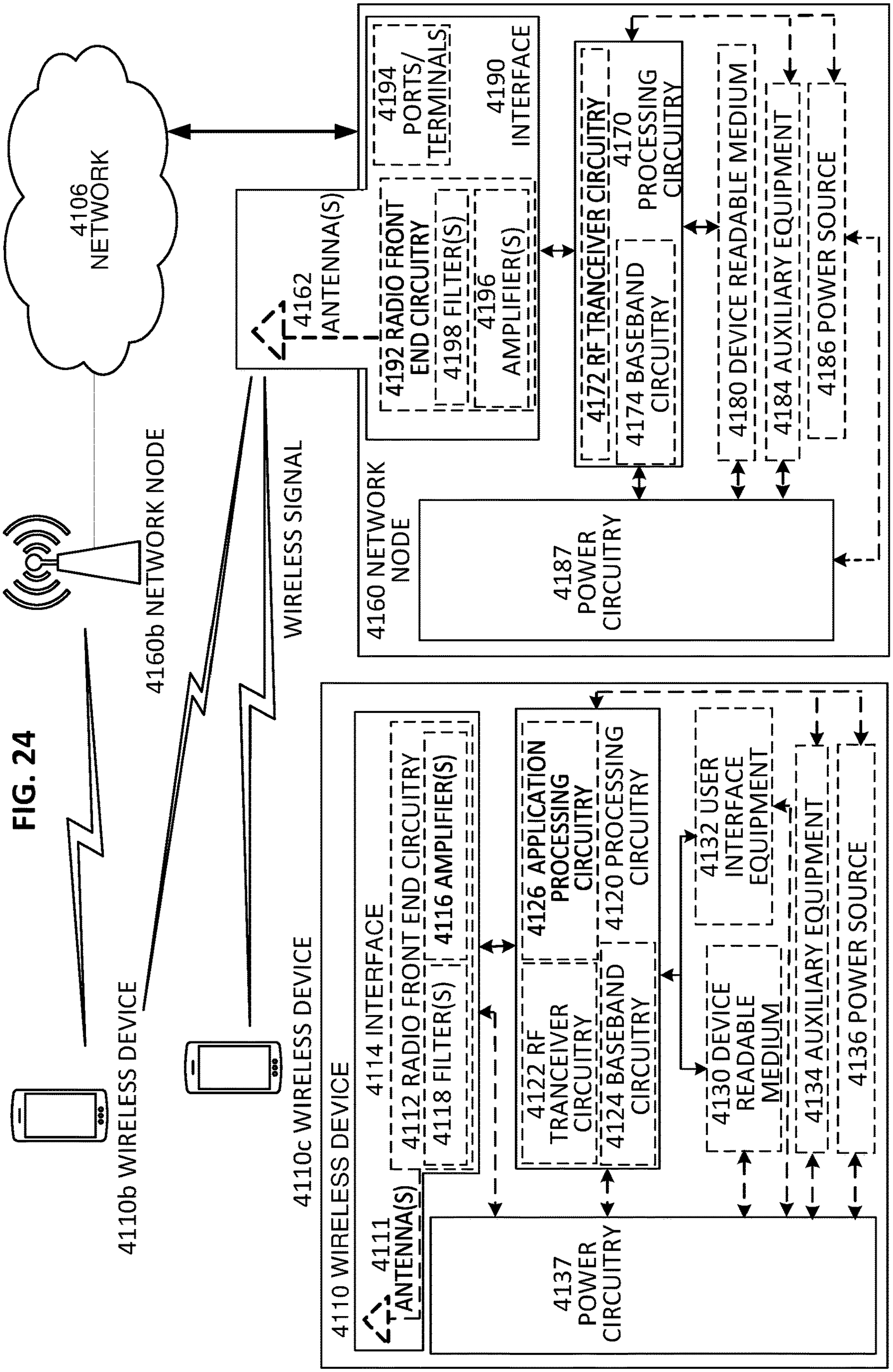
FIG. 24 is a block diagram of a wireless network in accordance with some embodiments.

FIG. 24 illustrates a wireless network in accordance with some embodiments.

Although the subject matter described herein may be implemented in any appropriate type of system using any suitable components, the embodiments disclosed herein are described in relation to a wireless network, such as the example wireless network illustrated in FIG. 24. For simplicity, the wireless network of FIG. 24 only depicts network 4106, network nodes 4160 and 4160*b*, and WDs 4110, 4110*b*, and 4110*c* (also referred to as mobile terminals). In practice, a wireless network may further include any additional elements suitable to support communication between wireless devices or between a wireless device and another communication device, such as a landline telephone, a service provider, or any other network node or end device. Of the illustrated components, network node 4160 and wireless device (WD) 4110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or Zig Bee standards.

Network 4106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 4160 and WD 4110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 24, network node 4160 includes processing circuitry 4170, device readable medium 4180, interface 4190, auxiliary equipment 4184, power source 4186, power circuitry 4187, and antenna 4162. Although network node 4160 illustrated in the example wireless network of FIG. 24 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 4160 are depicted as single boxes located within a larger box, or nested within multiple boxes, in practice, a network node may comprise multiple different physical components that make up a single illustrated component (e.g., device readable medium 4180 may comprise multiple separate hard drives as well as multiple RAM modules).

Similarly, network node 4160 may be composed of multiple physically separate components (e.g., a NodeB component and a RNC component, or a BTS component and a BSC component, etc.), which may each have their own respective components. In certain scenarios in which network node 4160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 4160 may be configured to support multiple radio access technologies (RATs). In such embodiments, some components may be duplicated (e.g., separate device readable medium 4180 for the different RATs) and some components may be reused (e.g., the same antenna 4162 may be shared by the RATs). Network node 4160 may also include multiple sets of the various illustrated components for different wireless technologies integrated into network node 4160, such as, for example, GSM, WCDMA, LTE, NR, WiFi, or Bluetooth wireless technologies. These wireless technologies may be integrated into the same or different chip or set of chips and other components within network node 4160.

Processing circuitry 4170 is configured to perform any determining, calculating, or similar operations (e.g., certain obtaining operations) described herein as being provided by a network node. These operations performed by processing circuitry 4170 may include processing information obtained by processing circuitry 4170 by, for example, converting the obtained information into other information, comparing the obtained information or converted information to information stored in the network node, and/or performing one or more operations based on the obtained information or converted information, and as a result of said processing making a determination.

Processing circuitry 4170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 4160 components, such as device readable medium 4180, network node 4160 functionality. For example, processing circuitry 4170 may execute instructions stored in device readable medium 4180 or in memory within processing circuitry 4170. Such functionality may include providing any of the various wireless features, functions, or benefits discussed herein. In some embodiments, processing circuitry 4170 may include a system on a chip (SOC).

In some embodiments, processing circuitry 4170 may include one or more of radio frequency (RF) transceiver circuitry 4172 and baseband processing circuitry 4174. In some embodiments, radio frequency (RF) transceiver circuitry 4172 and baseband processing circuitry 4174 may be on separate chips (or sets of chips), boards, or units, such as radio units and digital units. In alternative embodiments, part or all of RF transceiver circuitry 4172 and baseband processing circuitry 4174 may be on the same chip or set of chips, boards, or units In certain embodiments, some or all of the functionality described herein as being provided by a network node, base station, eNB or other such network device may be performed by processing circuitry 4170 executing instructions stored on device readable medium 4180 or memory within processing circuitry 4170. In alternative embodiments, some or all of the functionality may be provided by processing circuitry 4170 without executing instructions stored on a separate or discrete device readable medium, such as in a hard-wired manner. In any of those embodiments, whether executing instructions stored on a device readable storage medium or not, processing circuitry 4170 can be configured to perform the described functionality. The benefits provided by such functionality are not limited to processing circuitry 4170 alone or to other components of network node 4160, but are enjoyed by network node 4160 as a whole, and/or by end users and the wireless network generally.

Device readable medium 4180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 4170. Device readable medium 4180 may store any suitable instructions, data or information, including a computer program, software, an application including one or more of logic, rules, code, tables, etc. and/or other instructions capable of being executed by processing circuitry 4170 and, utilized by network node 4160. Device readable medium 4180 may be used to store any calculations made by processing circuitry 4170 and/or any data received via interface 4190. In some embodiments, processing circuitry 4170 and device readable medium 4180 may be considered to be integrated.

Interface 4190 is used in the wired or wireless communication of signalling and/or data between network node 4160, network 4106, and/or WDs 4110. As illustrated, interface 4190 comprises port(s)/terminal(s) 4194 to send and receive data, for example to and from network 4106 over a wired connection. Interface 4190 also includes radio front end circuitry 4192 that may be coupled to, or in certain embodiments a part of, antenna 4162. Radio front end circuitry 4192 comprises filters 4198 and amplifiers 4196. Radio front end circuitry 4192 may be connected to antenna 4162 and processing circuitry 4170. Radio front end circuitry may be configured to condition signals communicated between antenna 4162 and processing circuitry 4170. Radio front end circuitry 4192 may receive digital data that is to be sent out to other network nodes or WDs via a wireless connection. Radio front end circuitry 4192 may convert the digital data into a radio signal having the appropriate channel and bandwidth parameters using a combination of filters 4198 and/or amplifiers 4196. The radio signal may then be transmitted via antenna 4162. Similarly, when receiving data, antenna 4162 may collect radio signals which are then converted into digital data by radio front end circuitry 4192. The digital data may be passed to processing circuitry 4170. In other embodiments, the interface may comprise different components and/or different combinations of components.

In certain alternative embodiments, network node 4160 may not include separate radio front end circuitry 4192, instead, processing circuitry 4170 may comprise radio front end circuitry and may be connected to antenna 4162 without separate radio front end circuitry 4192. Similarly, in some embodiments, all or some of RF transceiver circuitry 4172 may be considered a part of interface 4190. In still other embodiments, interface 4190 may include one or more ports or terminals 4194, radio front end circuitry 4192, and RF transceiver circuitry 4172, as part of a radio unit (not shown), and interface 4190 may communicate with baseband processing circuitry 4174, which is part of a digital unit (not shown).

Antenna 4162 may include one or more antennas, or antenna arrays, configured to send and/or receive wireless signals. Antenna 4162 may be coupled to radio front end circuitry 4192 and may be any type of antenna capable of transmitting and receiving data and/or signals wirelessly. In some embodiments, antenna 4162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as M IMO. In certain embodiments, antenna 4162 may be separate from network node 4160 and may be connectable to network node 4160 through an interface or port.

Antenna 4162, interface 4190, and/or processing circuitry 4170 may be configured to perform any receiving operations and/or certain obtaining operations described herein as being performed by a network node. Any information, data and/or signals may be received from a wireless device, another network node and/or any other network equipment. Similarly, antenna 4162, interface 4190, and/or processing circuitry 4170 may be configured to perform any transmitting operations described herein as being performed by a network node. Any information, data and/or signals may be transmitted to a wireless device, another network node and/or any other network equipment.

Power circuitry 4187 may comprise, or be coupled to, power management circuitry and is configured to supply the components of network node 4160 with power for performing the functionality described herein. Power circuitry 4187 may receive power from power source 4186. Power source 4186 and/or power circuitry 4187 may be configured to provide power to the various components of network node 4160 in a form suitable for the respective components (e.g., at a voltage and current level needed for each respective component). Power source 4186 may either be included in, or external to, power circuitry 4187 and/or network node 4160. For example, network node 4160 may be connectable to an external power source (e.g., an electricity outlet) via an input circuitry or interface such as an electrical cable, whereby the external power source supplies power to power circuitry 4187. As a further example, power source 4186 may comprise a source of power in the form of a battery or battery pack which is connected to, or integrated in, power circuitry 4187. The battery may provide backup power should the external power source fail. Other types of power sources, such as photovoltaic devices, may also be used.

Alternative embodiments of network node 4160 may include additional components beyond those shown in FIG. 24 that may be responsible for providing certain aspects of the network node's functionality, including any of the functionality described herein and/or any functionality necessary to support the subject matter described herein. For example, network node 4160 may include user interface equipment to allow input of information into network node 4160 and to allow output of information from network node 4160. This may allow a user to perform diagnostic, maintenance, repair, and other administrative functions for network node 4160.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 4110 includes antenna 4111, interface 4114, processing circuitry 4120, device readable medium 4130, user interface equipment 4132, auxiliary equipment 4134, power source 4136 and power circuitry 4137. WD 4110 may include multiple sets of one or more of the illustrated components for different wireless technologies supported by WD 4110, such as, for example, GSM, WCDMA, LTE, NR, WiFi, WiMAX, or Bluetooth wireless technologies, just to mention a few. These wireless technologies may be integrated into the same or different chips or set of chips as other components within WD 4110.

Antenna 4111 may include one or more antennas or antenna arrays, configured to send and/or receive wireless signals, and is connected to interface 4114. In certain alternative embodiments, antenna 4111 may be separate from WD 4110 and be connectable to WD 4110 through an interface or port. Antenna 4111, interface 4114, and/or processing circuitry 4120 may be configured to perform any receiving or transmitting operations described herein as being performed by a WD. Any information, data and/or signals may be received from a network node and/or another WD. In some embodiments, radio front end circuitry and/or antenna 4111 may be considered an interface.

As illustrated, interface 4114 comprises radio front end circuitry 4112 and antenna 4111. Radio front end circuitry 4112 comprise one or more filters 4118 and amplifiers 4116. Radio front end circuitry 4112 is connected to antenna 4111 and processing circuitry 4120, and is configured to condition signals communicated between antenna 4111 and processing circuitry 4120. Radio front end circuitry 4112 may be coupled to or a part of antenna 4111. In some embodiments, WD 4110 may not include separate radio front end circuitry 4112; rather, processing circuitry 4120 may comprise radio front end circuitry and may be connected to antenna 4111. Similarly, in some embodiments, some or all of RF transceiver circuitry 4122 may be considered a part of interface 4114. Radio front end circuitry 4112 may receive digital data that is to be sent out to other network nodes or WDs via a wireless connection. Radio front end circuitry 4112 may convert the digital data into a radio signal having the appropriate channel and bandwidth parameters using a combination of filters 4118 and/or amplifiers 4116. The radio signal may then be transmitted via antenna 4111. Similarly, when receiving data, antenna 4111 may collect radio signals which are then converted into digital data by radio front end circuitry 4112. The digital data may be passed to processing circuitry 4120. In other embodiments, the interface may comprise different components and/or different combinations of components.

Processing circuitry 4120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 4110 components, such as device readable medium 4130, WD 4110 functionality. Such functionality may include providing any of the various wireless features or benefits discussed herein. For example, processing circuitry 4120 may execute instructions stored in device readable medium 4130 or in memory within processing circuitry 4120 to provide the functionality disclosed herein.

As illustrated, processing circuitry 4120 includes one or more of RF transceiver circuitry 4122, baseband processing circuitry 4124, and application processing circuitry 4126. In other embodiments, the processing circuitry may comprise different components and/or different combinations of components. In certain embodiments processing circuitry 4120 of WD 4110 may comprise a SOC. In some embodiments, RF transceiver circuitry 4122, baseband processing circuitry 4124, and application processing circuitry 4126 may be on separate chips or sets of chips. In alternative embodiments, part or all of baseband processing circuitry 4124 and application processing circuitry 4126 may be combined into one chip or set of chips, and RF transceiver circuitry 4122 may be on a separate chip or set of chips. In still alternative embodiments, part or all of RF transceiver circuitry 4122 and baseband processing circuitry 4124 may be on the same chip or set of chips, and application processing circuitry 4126 may be on a separate chip or set of chips. In yet other alternative embodiments, part or all of RF transceiver circuitry 4122, baseband processing circuitry 4124, and application processing circuitry 4126 may be combined in the same chip or set of chips. In some embodiments, RF transceiver circuitry 4122 may be a part of interface 4114. RF transceiver circuitry 4122 may condition RF signals for processing circuitry 4120.

In certain embodiments, some or all of the functionality described herein as being performed by a WD may be provided by processing circuitry 4120 executing instructions stored on device readable medium 4130, which in certain embodiments may be a computer-readable storage medium. In alternative embodiments, some or all of the functionality may be provided by processing circuitry 4120 without executing instructions stored on a separate or discrete device readable storage medium, such as in a hard-wired manner. In any of those particular embodiments, whether executing instructions stored on a device readable storage medium or not, processing circuitry 4120 can be configured to perform the described functionality. The benefits provided by such functionality are not limited to processing circuitry 4120 alone or to other components of WD 4110, but are enjoyed by WD 4110 as a whole, and/or by end users and the wireless network generally.

Processing circuitry 4120 may be configured to perform any determining, calculating, or similar operations (e.g., certain obtaining operations) described herein as being performed by a WD. These operations, as performed by processing circuitry 4120, may include processing information obtained by processing circuitry 4120 by, for example, converting the obtained information into other information, comparing the obtained information or converted information to information stored by WD 4110, and/or performing one or more operations based on the obtained information or converted information, and as a result of said processing making a determination.

Device readable medium 4130 may be operable to store a computer program, software, an application including one or more of logic, rules, code, tables, etc. and/or other instructions capable of being executed by processing circuitry 4120. Device readable medium 4130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 4120. In some embodiments, processing circuitry 4120 and device readable medium 4130 may be considered to be integrated.

User interface equipment 4132 may provide components that allow for a human user to interact with WD 4110. Such interaction may be of many forms, such as visual, audial, tactile, etc. User interface equipment 4132 may be operable to produce output to the user and to allow the user to provide input to WD 4110. The type of interaction may vary depending on the type of user interface equipment 4132 installed in WD 4110. For example, if WD 4110 is a smart phone, the interaction may be via a touch screen; if WD 4110 is a smart meter, the interaction may be through a screen that provides usage (e.g., the number of gallons used) or a speaker that provides an audible alert (e.g., if smoke is detected). User interface equipment 4132 may include input interfaces, devices and circuits, and output interfaces, devices and circuits. User interface equipment 4132 is configured to allow input of information into WD 4110, and is connected to processing circuitry 4120 to allow processing circuitry 4120 to process the input information. User interface equipment 4132 may include, for example, a microphone, a proximity or other sensor, keys/buttons, a touch display, one or more cameras, a USB port, or other input circuitry. User interface equipment 4132 is also configured to allow output of information from WD 4110, and to allow processing circuitry 4120 to output information from WD 4110. User interface equipment 4132 may include, for example, a speaker, a display, vibrating circuitry, a USB port, a headphone interface, or other output circuitry. Using one or more input and output interfaces, devices, and circuits, of user interface equipment 4132, WD 4110 may communicate with end users and/or the wireless network, and allow them to benefit from the functionality described herein.

Auxiliary equipment 4134 is operable to provide more specific functionality which may not be generally performed by WDs. This may comprise specialized sensors for doing measurements for various purposes, interfaces for additional types of communication such as wired communications etc. The inclusion and type of components of auxiliary equipment 4134 may vary depending on the embodiment and/or scenario.

Power source 4136 may, in some embodiments, be in the form of a battery or battery pack. Other types of power sources, such as an external power source (e.g., an electricity outlet), photovoltaic devices or power cells, may also be used. WD 4110 may further comprise power circuitry 4137 for delivering power from power source 4136 to the various parts of WD 4110 which need power from power source 4136 to carry out any functionality described or indicated herein. Power circuitry 4137 may in certain embodiments comprise power management circuitry. Power circuitry 4137 may additionally or alternatively be operable to receive power from an external power source; in which case WD 4110 may be connectable to the external power source (such as an electricity outlet) via input circuitry or an interface such as an electrical power cable. Power circuitry 4137 may also in certain embodiments be operable to deliver power from an external power source to power source 4136. This may be, for example, for the charging of power source 4136. Power circuitry 4137 may perform any formatting, converting, or other modification to the power from power source 4136 to make the power suitable for the respective components of WD 4110 to which power is supplied.

Figure 25:
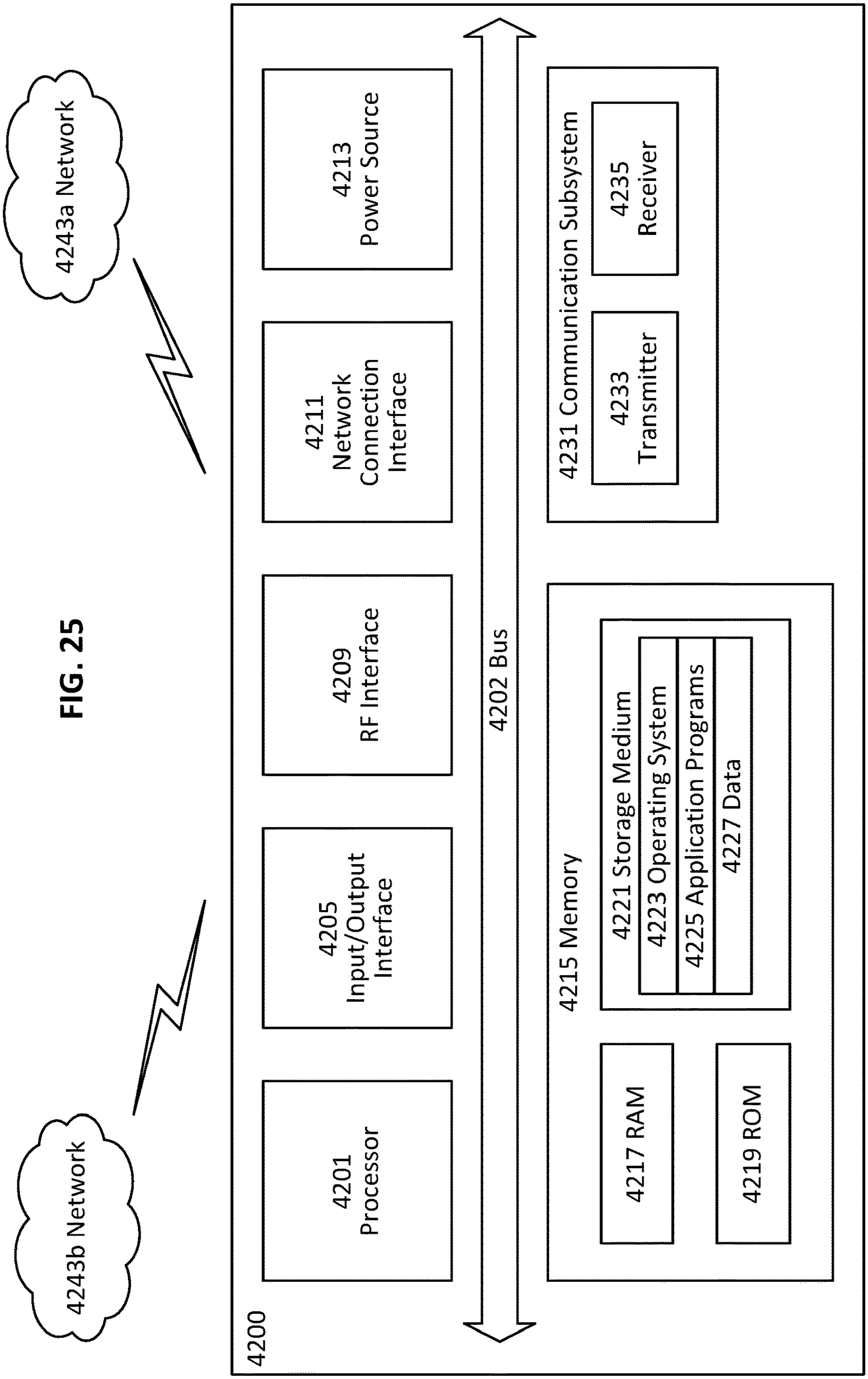
FIG. 25 is a block diagram of a user equipment in accordance with some embodiments

FIG. 25 illustrates a user Equipment in accordance with some embodiments.

FIG. 25 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 42200 may be any UE identified by the 3rd Generation Partnership Project (3GPP), including a NB-IoT UE, a machine type communication (MTC) UE, and/or an enhanced MTC (eMTC) UE. UE 4200, as illustrated in FIG. 25, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeable. Accordingly, although FIG. 25 is a UE, the components discussed herein are equally applicable to a WD, and vice-versa.

In FIG. 25, UE 4200 includes processing circuitry 4201 that is operatively coupled to input/output interface 4205, radio frequency (RF) interface 4209, network connection interface 4211, memory 4215 including random access memory (RAM) 4217, read-only memory (ROM) 4219, and storage medium 4221 or the like, communication subsystem 4231, power source 4213, and/or any other component, or any combination thereof. Storage medium 4221 includes operating system 4223, application program 4225, and data 4227. In other embodiments, storage medium 4221 may include other similar types of information. Certain UEs may utilize all of the components shown in FIG. 25, or only a subset of the components. The level of integration between the components may vary from one UE to another UE. Further, certain UEs may contain multiple instances of a component, such as multiple processors, memories, transceivers, transmitters, receivers, etc.

In FIG. 25, processing circuitry 4201 may be configured to process computer instructions and data. Processing circuitry 4201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 4201 may include two central processing units (CPUs). Data may be information in a form suitable for use by a computer.

In the depicted embodiment, input/output interface 4205 may be configured to provide a communication interface to an input device, output device, or input and output device. UE 4200 may be configured to use an output device via input/output interface 4205. An output device may use the same type of interface port as an input device. For example, a USB port may be used to provide input to and output from UE 4200. The output device may be a speaker, a sound card, a video card, a display, a monitor, a printer, an actuator, an emitter, a smartcard, another output device, or any combination thereof. UE 4200 may be configured to use an input device via input/output interface 4205 to allow a user to capture information into UE 4200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 25, RF interface 4209 may be configured to provide a communication interface to RF components such as a transmitter, a receiver, and an antenna. Network connection interface 4211 may be configured to provide a communication interface to network 4243*a*. Network 4243*a* may encompass wired and/or wireless networks such as a local-area network (LAN), a wide-area network (WAN), a computer network, a wireless network, a telecommunications network, another like network or any combination thereof. For example, network 4243*a* may comprise a Wi-Fi network. Network connection interface 4211 may be configured to include a receiver and a transmitter interface used to communicate with one or more other devices over a communication network according to one or more communication protocols, such as Ethernet, TCP/IP, SONET, ATM, or the like. Network connection interface 4211 may implement receiver and transmitter functionality appropriate to the communication network links (e.g., optical, electrical, and the like). The transmitter and receiver functions may share circuit components, software or firmware, or alternatively may be implemented separately.

RAM 4217 may be configured to interface via bus 4202 to processing circuitry 4201 to provide storage or caching of data or computer instructions during the execution of software programs such as the operating system, application programs, and device drivers. ROM 4219 may be configured to provide computer instructions or data to processing circuitry 4201. For example, ROM 4219 may be configured to store invariant low-level system code or data for basic system functions such as basic input and output (I/O), startup, or reception of keystrokes from a keyboard that are stored in a non-volatile memory. Storage medium 4221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 4221 may be configured to include operating system 4223, application program 4225 such as a web browser application, a widget or gadget engine or another application, and data file 4227. Storage medium 4221 may store, for use by UE 4200, any of a variety of various operating systems or combinations of operating systems.

Storage medium 4221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 4221 may allow UE 4200 to access computer-executable instructions, application programs or the like, stored on transitory or non-transitory memory media, to off-load data, or to upload data. An article of manufacture, such as one utilizing a communication system may be tangibly embodied in storage medium 4221, which may comprise a device readable medium.

In FIG. 25, processing circuitry 4201 may be configured to communicate with network 4243*b* using communication subsystem 4231. Network 4243*a* and network 4243*b* may be the same network or networks or different network or networks. Communication subsystem 4231 may be configured to include one or more transceivers used to communicate with network 4243*b*. For example, communication subsystem 4231 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 4233 and/or receiver 4235 to implement transmitter or receiver functionality, respectively, appropriate to the RAN links (e.g., frequency allocations and the like). Further, transmitter 4233 and receiver 4235 of each transceiver may share circuit components, software or firmware, or alternatively may be implemented separately.

In the illustrated embodiment, the communication functions of communication subsystem 4231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 4231 may include cellular communication, Wi-Fi communication, Bluetooth communication, and GPS communication. Network 4243*b* may encompass wired and/or wireless networks such as a local-area network (LAN), a wide-area network (WAN), a computer network, a wireless network, a telecommunications network, another like network or any combination thereof. For example, network 4243*b* may be a cellular network, a Wi-Fi network, and/or a near-field network. Power source 4213 may be configured to provide alternating current (AC) or direct current (DC) power to components of UE 4200.

The features, benefits and/or functions described herein may be implemented in one of the components of UE 4200 or partitioned across multiple components of UE 4200. Further, the features, benefits, and/or functions described herein may be implemented in any combination of hardware, software or firmware. In one example, communication subsystem 4231 may be configured to include any of the components described herein. Further, processing circuitry 4201 may be configured to communicate with any of such components over bus 4202. In another example, any of such components may be represented by program instructions stored in memory that when executed by processing circuitry 4201 perform the corresponding functions described herein. In another example, the functionality of any of such components may be partitioned between processing circuitry 4201 and communication subsystem 4231. In another example, the non-computationally intensive functions of any of such components may be implemented in software or firmware and the computationally intensive functions may be implemented in hardware.

Figure 26:
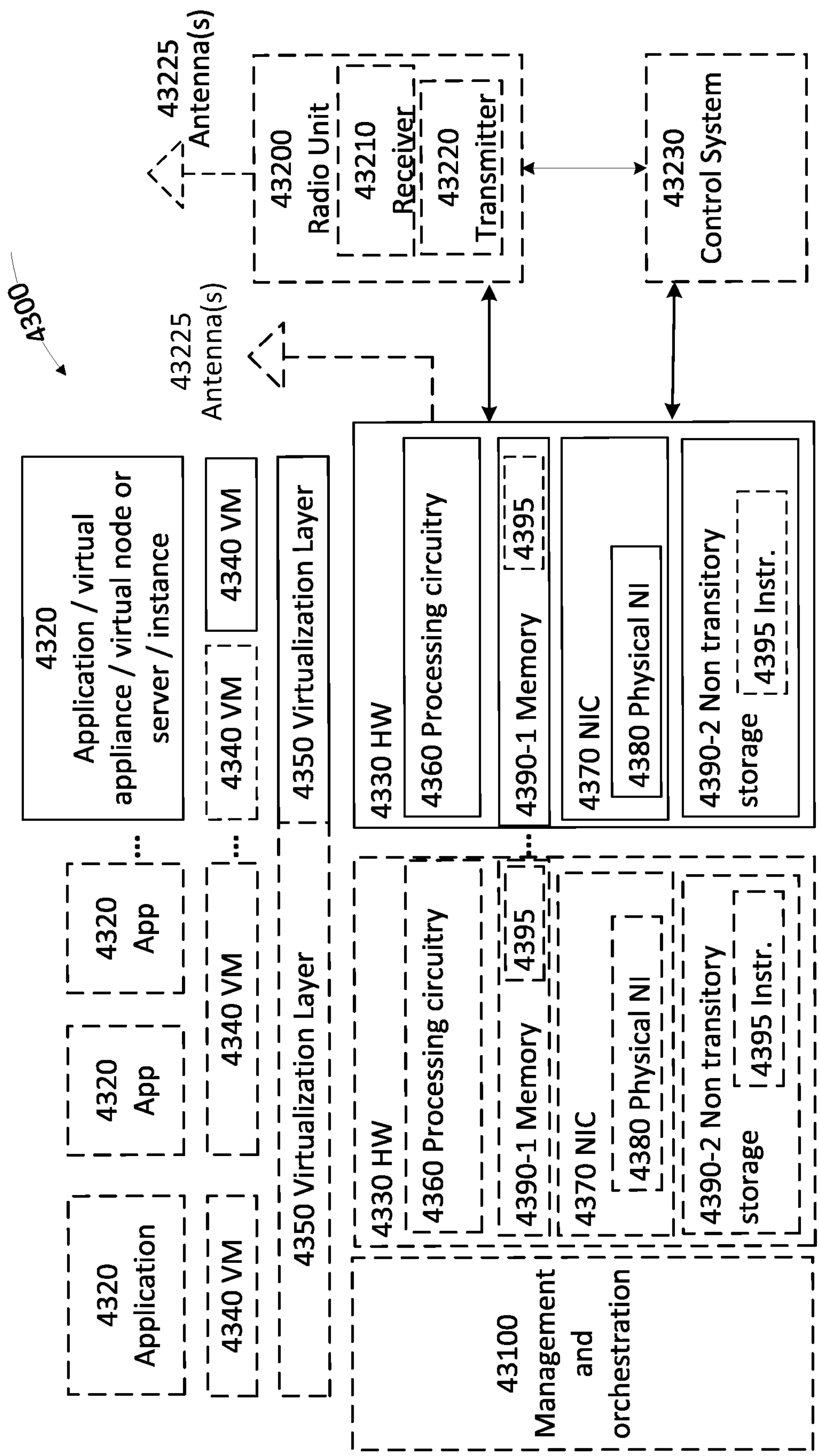
FIG. 26 is a block diagram of a virtualization environment in accordance with some embodiments.

FIG. 26 illustrates a virtualization environment in accordance with some embodiments.

FIG. 26 is a schematic block diagram illustrating a virtualization environment 4300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 4300 hosted by one or more of hardware nodes 4330. Further, in embodiments in which the virtual node is not a radio access node or does not require radio connectivity (e.g., a core network node), then the network node may be entirely virtualized.

The functions may be implemented by one or more applications 4320 (which may alternatively be called software instances, virtual appliances, network functions, virtual nodes, virtual network functions, etc.) operative to implement some of the features, functions, and/or benefits of some of the embodiments disclosed herein. Applications 4320 are run in virtualization environment 4300 which provides hardware 4330 comprising processing circuitry 4360 and memory 4390. Memory 4390 contains instructions 4395 executable by processing circuitry 4360 whereby application 4320 is operative to provide one or more of the features, benefits, and/or functions disclosed herein.

Virtualization environment 4300, comprises general-purpose or special-purpose network hardware devices 4330 comprising a set of one or more processors or processing circuitry 4360, which may be commercial off-the-shelf (COTS) processors, dedicated Application Specific Integrated Circuits (ASICs), or any other type of processing circuitry including digital or analog hardware components or special purpose processors. Each hardware device may comprise memory 4390-1 which may be non-persistent memory for temporarily storing instructions 4395 or software executed by processing circuitry 4360. Each hardware device may comprise one or more network interface controllers (NICs) 4370, also known as network interface cards, which include physical network interface 4380. Each hardware device may also include non-transitory, persistent, machine-readable storage media 4390-2 having stored therein software 4395 and/or instructions executable by processing circuitry 4360. Software 4395 may include any type of software including software for instantiating one or more virtualization layers 4350 (also referred to as hypervisors), software to execute virtual machines 4340 as well as software allowing it to execute functions, features and/or benefits described in relation with some embodiments described herein.

Virtual machines 4340 comprise virtual processing, virtual memory, virtual networking or interface and virtual storage, and may be run by a corresponding virtualization layer 4350 or hypervisor. Different embodiments of the instance of virtual appliance 4320 may be implemented on one or more of virtual machines 4340, and the implementations may be made in different ways.

During operation, processing circuitry 4360 executes software 4395 to instantiate the hypervisor or virtualization layer 4350, which may sometimes be referred to as a virtual machine monitor (VMM). Virtualization layer 4350 may present a virtual operating platform that appears like networking hardware to virtual machine 4340.

As shown in FIG. 26, hardware 4330 may be a standalone network node with generic or specific components. Hardware 4330 may comprise antenna 43225 and may implement some functions via virtualization. Alternatively, hardware 4330 may be part of a larger cluster of hardware (e.g. such as in a data center or customer premise equipment (CPE)) where many hardware nodes work together and are managed via management and orchestration (MANO) 43100, which, among others, oversees lifecycle management of applications 4320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 4340 may be a software implementation of a physical machine that runs programs as if they were executing on a physical, non-virtualized machine. Each of virtual machines 4340, and that part of hardware 4330 that executes that virtual machine, be it hardware dedicated to that virtual machine and/or hardware shared by that virtual machine with others of the virtual machines 4340, forms a separate virtual network elements (VNE).

Still in the context of NFV, Virtual Network Function (VNF) is responsible for handling specific network functions that run in one or more virtual machines 4340 on top of hardware networking infrastructure 4330 and corresponds to application 4320 in FIG. 26.

In some embodiments, one or more radio units 43200 that each include one or more transmitters 43220 and one or more receivers 43210 may be coupled to one or more antennas 43225. Radio units 43200 may communicate directly with hardware nodes 4330 via one or more appropriate network interfaces and may be used in combination with the virtual components to provide a virtual node with radio capabilities, such as a radio access node or a base station.

In some embodiments, some signalling can be effected with the use of control system 43230 which may alternatively be used for communication between the hardware nodes 4330 and radio units 43200.

Figure 27:
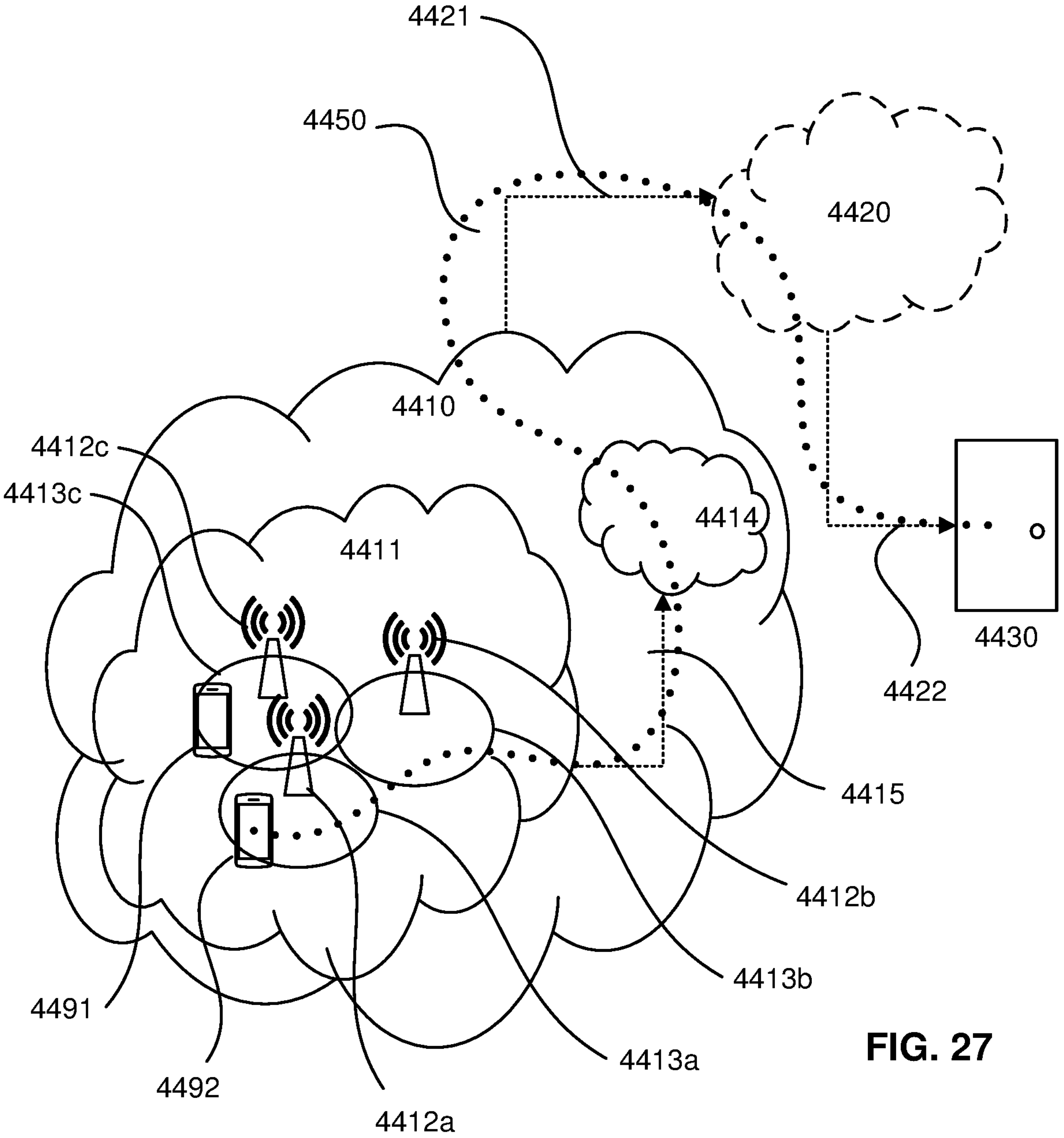
FIG. 27 is a block diagram of a telecommunication network connected via an intermediate network to a host computer in accordance with some embodiments.

FIG. 27 illustrates a telecommunication network connected via an intermediate network to a host computer in accordance with some embodiments.

With reference to FIG. 27, in accordance with an embodiment, a communication system includes telecommunication network 4410, such as a 3GPP-type cellular network, which comprises access network 4411, such as a radio access network, and core network 4414. Access network 4411 comprises a plurality of base stations 4412*a*, 4412*b*, 4412*c*, such as NBs, eNBs, gNBs or other types of wireless access points, each defining a corresponding coverage area 4413*a*, 4413*b*, 4413*c*. Each base station 4412*a*, 4412*b*, 4412*c* is connectable to core network 4414 over a wired or wireless connection 4415. A first UE 4491 located in coverage area 4413*c* is configured to wirelessly connect to, or be paged by, the corresponding base station 4412*c*. A second UE 4492 in coverage area 4413*a* is wirelessly connectable to the corresponding base station 4412*a*. While a plurality of UEs 4491, 4492 are illustrated in this example, the disclosed embodiments are equally applicable to a situation where a sole UE is in the coverage area or where a sole UE is connecting to the corresponding base station 4412.

Telecommunication network 4410 is itself connected to host computer 4430, which may be embodied in the hardware and/or software of a standalone server, a cloud-implemented server, a distributed server or as processing resources in a server farm. Host computer 4430 may be under the ownership or control of a service provider, or may be operated by the service provider or on behalf of the service provider. Connections 4421 and 4422 between telecommunication network 4410 and host computer 4430 may extend directly from core network 4414 to host computer 4430 or may go via an optional intermediate network 4420. Intermediate network 4420 may be one of, or a combination of more than one of, a public, private or hosted network; intermediate network 4420, if any, may be a backbone network or the Internet; in particular, intermediate network 4420 may comprise two or more sub-networks (not shown).

The communication system of FIG. 27 as a whole enables connectivity between the connected UEs 4491, 4492 and host computer 4430. The connectivity may be described as an over-the-top (OTT) connection 4450. Host computer 4430 and the connected UEs 4491, 4492 are configured to communicate data and/or signaling via OTT connection 4450, using access network 4411, core network 4414, any intermediate network 4420 and possible further infrastructure (not shown) as intermediaries. OTT connection 4450 may be transparent in the sense that the participating communication devices through which OTT connection 4450 passes are unaware of routing of uplink and downlink communications. For example, base station 4412 may not or need not be informed about the past routing of an incoming downlink communication with data originating from host computer 4430 to be forwarded (e.g., handed over) to a connected UE 4491. Similarly, base station 4412 need not be aware of the future routing of an outgoing uplink communication originating from the UE 4491 towards the host computer 4430.

Figure 28:
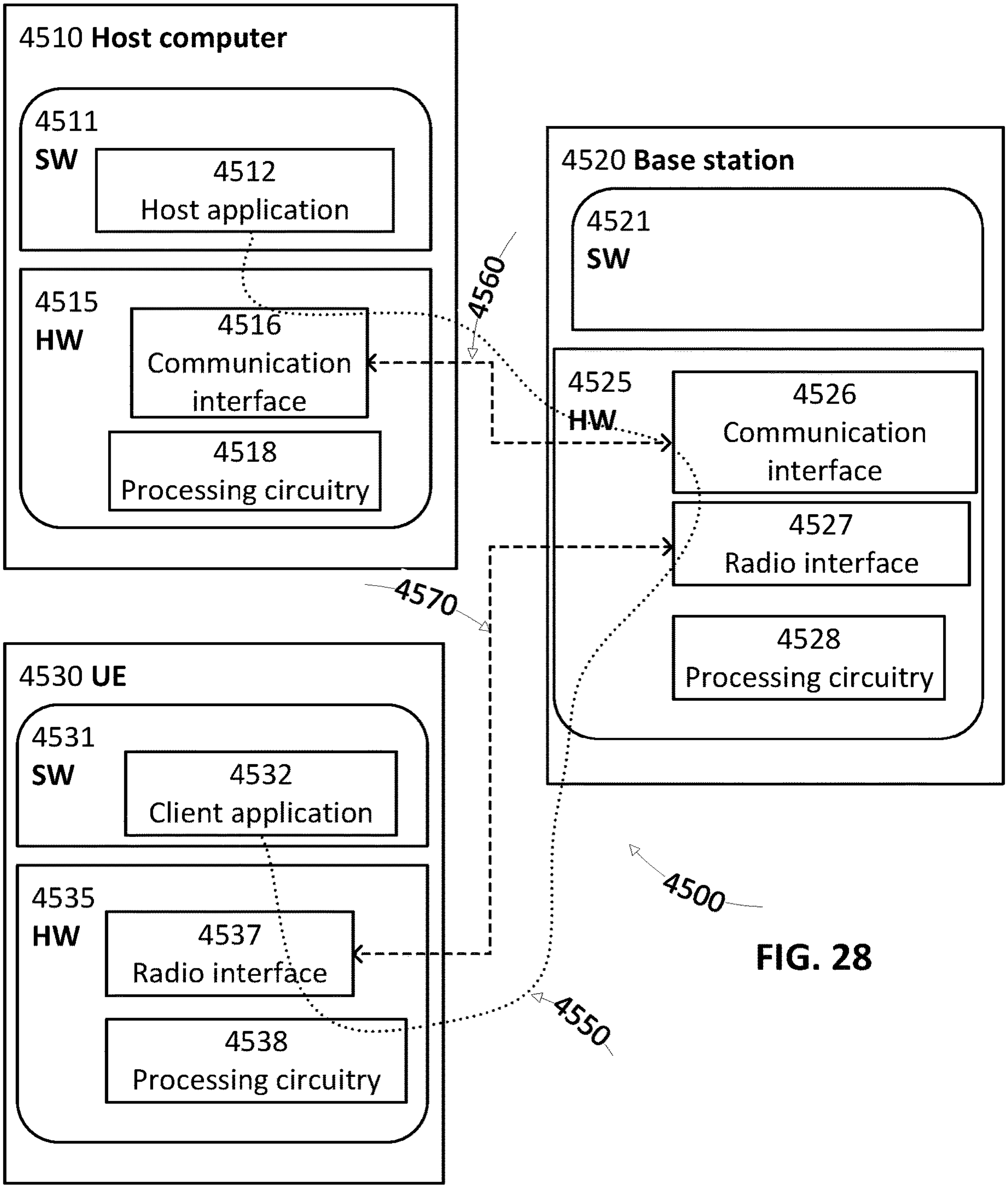
FIG. 28 is a block diagram of a host computer communicating via a base station with a user equipment over a partially wireless connection in accordance with some embodiments.

FIG. 28 illustrates a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 28. In communication system 4500, host computer 4510 comprises hardware 4515 including communication interface 4516 configured to set up and maintain a wired or wireless connection with an interface of a different communication device of communication system 4500. Host computer 4510 further comprises processing circuitry 4518, which may have storage and/or processing capabilities. In particular, processing circuitry 4518 may comprise one or more programmable processors, application-specific integrated circuits, field programmable gate arrays or combinations of these (not shown) adapted to execute instructions. Host computer 4510 further comprises software 4511, which is stored in or accessible by host computer 4510 and executable by processing circuitry 4518. Software 4511 includes host application 4512. Host application 4512 may be operable to provide a service to a remote user, such as UE 4530 connecting via OTT connection 4550 terminating at UE 4530 and host computer 4510. In providing the service to the remote user, host application 4512 may provide user data which is transmitted using OTT connection 4550.

Communication system 4500 further includes base station 4520 provided in a telecommunication system and comprising hardware 4525 enabling it to communicate with host computer 4510 and with UE 4530. Hardware 4525 may include communication interface 4526 for setting up and maintaining a wired or wireless connection with an interface of a different communication device of communication system 4500, as well as radio interface 4527 for setting up and maintaining at least wireless connection 4570 with UE 4530 located in a coverage area (not shown in FIG. 28) served by base station 4520. Communication interface 4526 may be configured to facilitate connection 4560 to host computer 4510. Connection 4560 may be direct or it may pass through a core network (not shown in FIG. 28) of the telecommunication system and/or through one or more intermediate networks outside the telecommunication system. In the embodiment shown, hardware 4525 of base station 4520 further includes processing circuitry 4528, which may comprise one or more programmable processors, application-specific integrated circuits, field programmable gate arrays or combinations of these (not shown) adapted to execute instructions. Base station 4520 further has software 4521 stored internally or accessible via an external connection.

Communication system 4500 further includes UE 4530 already referred to. Its hardware 4535 may include radio interface 4537 configured to set up and maintain wireless connection 4570 with a base station serving a coverage area in which UE 4530 is currently located. Hardware 4535 of UE 4530 further includes processing circuitry 4538, which may comprise one or more programmable processors, application-specific integrated circuits, field programmable gate arrays or combinations of these (not shown) adapted to execute instructions. UE 4530 further comprises software 4531, which is stored in or accessible by UE 4530 and executable by processing circuitry 4538. Software 4531 includes client application 4532. Client application 4532 may be operable to provide a service to a human or non-human user via UE 4530, with the support of host computer 4510. In host computer 4510, an executing host application 4512 may communicate with the executing client application 4532 via OTT connection 4550 terminating at UE 4530 and host computer 4510. In providing the service to the user, client application 4532 may receive request data from host application 4512 and provide user data in response to the request data. OTT connection 4550 may transfer both the request data and the user data. Client application 4532 may interact with the user to generate the user data that it provides.

It is noted that host computer 4510, base station 4520 and UE 4530 illustrated in FIG. 28 may be similar or identical to host computer 4430, one of base stations 4412*a*, 4412*b*, 4412*c* and one of UEs 4491, 4492 of FIG. 27, respectively. This is to say, the inner workings of these entities may be as shown in FIG. 28 and independently, the surrounding network topology may be that of FIG. 27.

In FIG. 28, OTT connection 4550 has been drawn abstractly to illustrate the communication between host computer 4510 and UE 4530 via base station 4520, without explicit reference to any intermediary devices and the precise routing of messages via these devices. Network infrastructure may determine the routing, which it may be configured to hide from UE 4530 or from the service provider operating host computer 4510, or both. While OTT connection 4550 is active, the network infrastructure may further take decisions by which it dynamically changes the routing (e.g., on the basis of load balancing consideration or reconfiguration of the network).

Wireless connection 4570 between UE 4530 and base station 4520 is in accordance with the teachings of the embodiments described throughout this disclosure. One or more of the various embodiments may improve the performance of OTT services provided to UE 4530 using OTT connection 4550, in which wireless connection 4570 forms the last segment. For example, the teachings of these embodiments provide OTT applications such as VR/AR, gaming or industrial IoT applications with greater positioning accuracy. In some examples the greater positioning accuracy may enable the network management systems and access functions to dynamically manage resources to be better adapted to the exact location within the access network serving area and therefore enhance the resource allocations, scheduling, etc which means that specific OTT services will be more reliable and be able to access resources as required with improved latency.

A measurement procedure may be provided for the purpose of monitoring data rate, latency and other factors on which the one or more embodiments improve. There may further be an optional network functionality for reconfiguring OTT connection 4550 between host computer 4510 and UE 4530, in response to variations in the measurement results. The measurement procedure and/or the network functionality for reconfiguring OTT connection 4550 may be implemented in software 4511 and hardware 4515 of host computer 4510 or in software 4531 and hardware 4535 of UE 4530, or both. In embodiments, sensors (not shown) may be deployed in or in association with communication devices through which OTT connection 4550 passes; the sensors may participate in the measurement procedure by supplying values of the monitored quantities exemplified above, or supplying values of other physical quantities from which software 4511, 4531 may compute or estimate the monitored quantities. The reconfiguring of OTT connection 4550 may include message format, retransmission settings, preferred routing etc.; the reconfiguring need not affect base station 4520, and it may be unknown or imperceptible to base station 4520. Such procedures and functionalities may be known and practiced in the art. In certain embodiments, measurements may involve proprietary UE signaling facilitating host computer 4510's measurements of throughput, propagation times, latency and the like. The measurements may be implemented in that software 4511 and 4531 causes messages to be transmitted, in particular empty or 'dummy' messages, using OTT connection 4550 while it monitors propagation times, errors etc.

Figure 29:
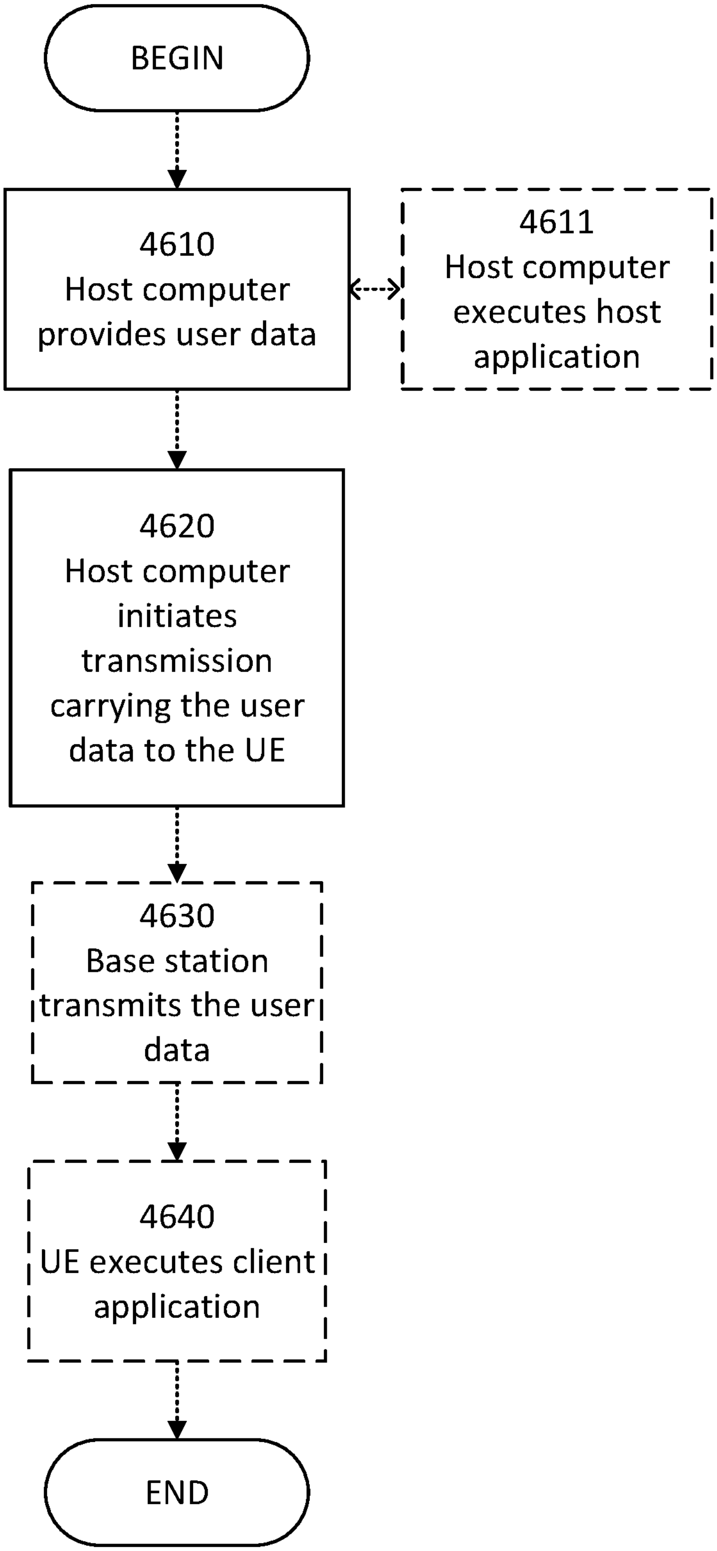
FIG. 29 is a block diagram of methods implemented in a communication system including a host computer, a base station and a user equipment in accordance with some embodiments.

FIG. 29 illustrates methods implemented in a communication system including a host computer, a base station and a user equipment in accordance with some embodiments FIG. 29 is a flowchart illustrating a method implemented in a communication system, in accordance with one embodiment. The communication system includes a host computer, a base station and a UE which may be those described with reference to FIGS. 27-28. For simplicity of the present disclosure, only drawing references to FIG. 29 will be included in this section. In step 4610, the host computer provides user data. In substep 4611 (which may be optional) of step 4610, the host computer provides the user data by executing a host application. In step 4620, the host computer initiates a transmission carrying the user data to the UE. In step 4630 (which may be optional), the base station transmits to the UE the user data which was carried in the transmission that the host computer initiated, in accordance with the teachings of the embodiments described throughout this disclosure. In step 4640 (which may also be optional), the UE executes a client application associated with the host application executed by the host computer.

Figure 30:
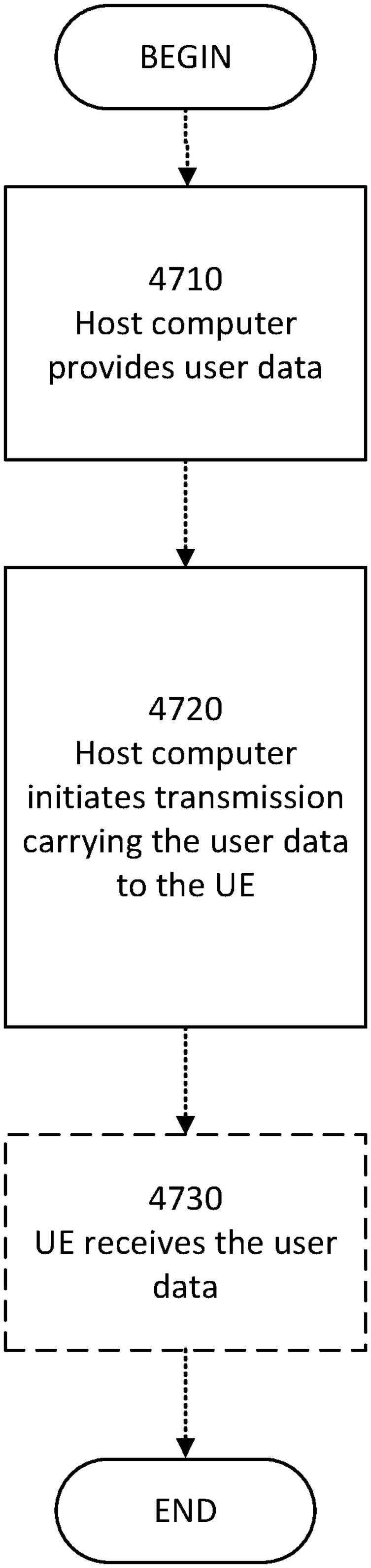
FIG. 30 is a block diagram of methods implemented in a communication system including a host computer, a base station and a user equipment in accordance with some embodiments.

FIG. 30 illustrates methods implemented in a communication system including a host computer, a base station and a user equipment in accordance with some embodiments.

FIG. 30 is a flowchart illustrating a method implemented in a communication system, in accordance with one embodiment. The communication system includes a host computer, a base station and a UE which may be those described with reference to FIGS. 27-28. For simplicity of the present disclosure, only drawing references to FIG. 30 will be included in this section. In step 4710 of the method, the host computer provides user data. In an optional substep (not shown) the host computer provides the user data by executing a host application. In step 4720, the host computer initiates a transmission carrying the user data to the UE. The transmission may pass via the base station, in accordance with the teachings of the embodiments described throughout this disclosure. In step 4730 (which may be optional), the UE receives the user data carried in the transmission.

Figure 31:
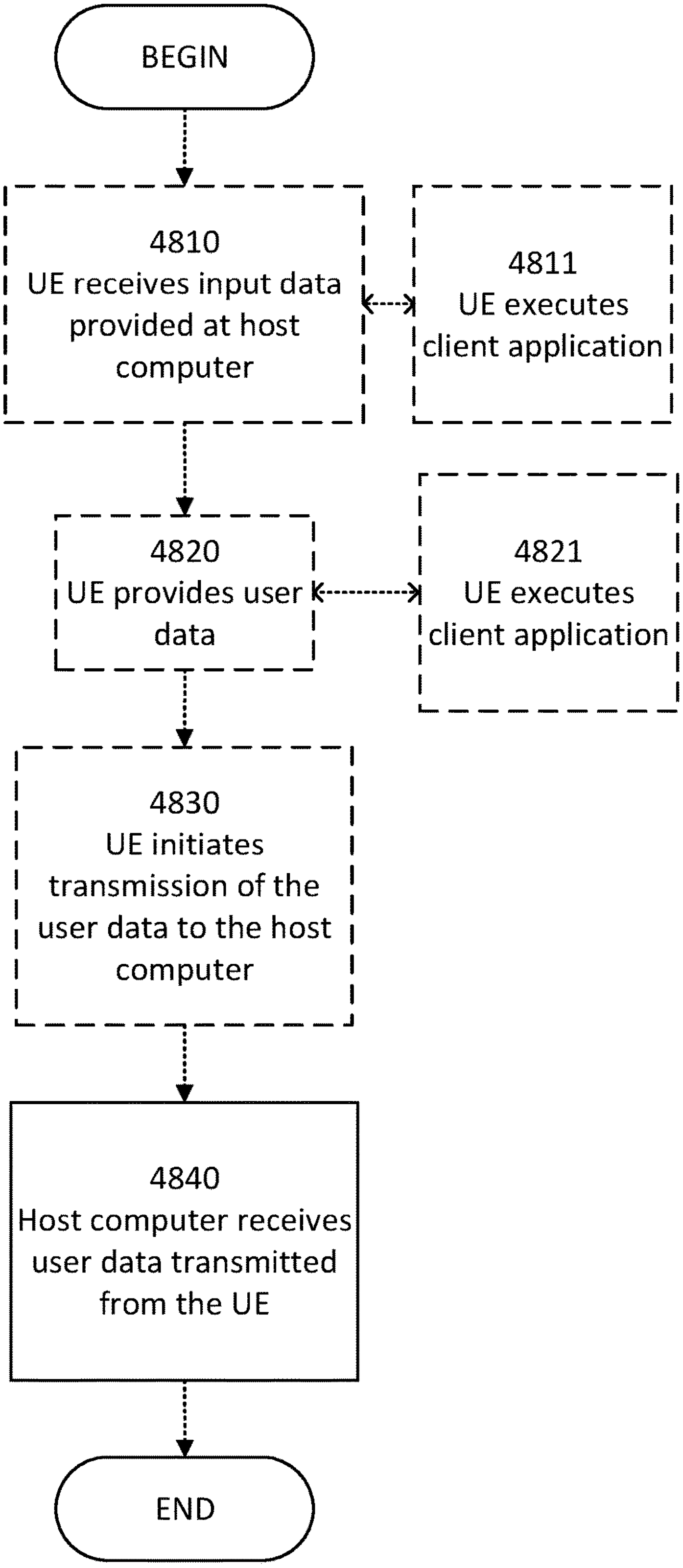
FIG. 31 is a block diagram of methods implemented in a communication system including a host computer, a base station and a user equipment in accordance with some embodiments.

FIG. 31 illustrates methods implemented in a communication system including a host computer, a base station and a user equipment in accordance with some embodiments.

FIG. 31 is a flowchart illustrating a method implemented in a communication system, in accordance with one embodiment. The communication system includes a host computer, a base station and a UE which may be those described with reference to FIGS. 27-28. For simplicity of the present disclosure, only drawing references to FIG. 31 will be included in this section. In step 4810 (which may be optional), the UE receives input data provided by the host computer. Additionally or alternatively, in step 4820, the UE provides user data. In substep 4821 (which may be optional) of step 4820, the UE provides the user data by executing a client application. In substep 4811 (which may be optional) of step 4810, the UE executes a client application which provides the user data in reaction to the received input data provided by the host computer. In providing the user data, the executed client application may further consider user input received from the user. Regardless of the specific manner in which the user data was provided, the UE initiates, in substep 4830 (which may be optional), transmission of the user data to the host computer. In step 4840 of the method, the host computer receives the user data transmitted from the UE, in accordance with the teachings of the embodiments described throughout this disclosure.

Figure 32:
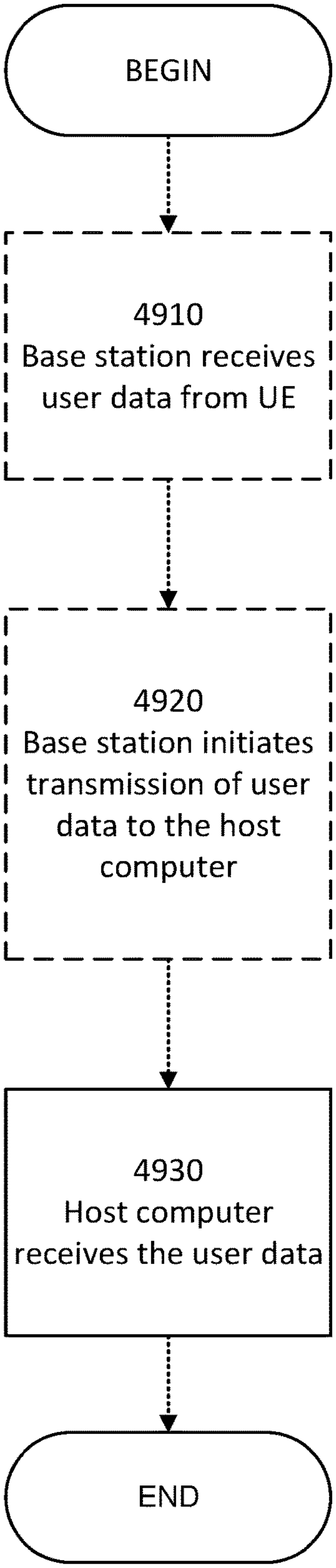
FIG. 32 is a block diagram of methods implemented in a communication system including a host computer, a base station and a user equipment in accordance with some embodiments.

FIG. 32 illustrates methods implemented in a communication system including a host computer, a base station and a user equipment in accordance with some embodiments FIG. 32 is a flowchart illustrating a method implemented in a communication system, in accordance with one embodiment. The communication system includes a host computer, a base station and a UE which may be those described with reference to FIGS. 27-28. For simplicity of the present disclosure, only drawing references to FIG. 32 will be included in this section. In step 4910 (which may be optional), in accordance with the teachings of the embodiments described throughout this disclosure, the base station receives user data from the UE. In step 4920 (which may be optional), the base station initiates transmission of the received user data to the host computer. In step 4930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Further definitions and embodiments are discussed below.

In the above-description of various embodiments of present inventive concepts, it is to be understood that the terminology used herein is for the purpose of describing particular embodiments only and is not intended to be limiting of present inventive concepts. Unless otherwise defined, all terms (including technical and scientific terms) used herein have the same meaning as commonly understood by one of ordinary skill in the art to which present inventive concepts belong. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

When an element is referred to as being “connected”, “coupled”, “responsive”, or variants thereof to another element, it can be directly connected, coupled, or responsive to the other element or intervening elements may be present. In contrast, when an element is referred to as being “directly connected”, “directly coupled”, “directly responsive”, or variants thereof to another element, there are no intervening elements present. Like numbers refer to like elements throughout. Furthermore, “coupled”, “connected”, “responsive”, or variants thereof as used herein may include wirelessly coupled, connected, or responsive. As used herein, the singular forms “a”, “an” and “the” are intended to include the plural forms as well, unless the context clearly indicates otherwise. Well-known functions or constructions may not be described in detail for brevity and/or clarity. The term “and/or” (abbreviated “/”) includes any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. The same reference numerals or the same reference designators denote the same or similar elements throughout the specification.

As used herein, the terms “comprise”, “comprising”, “comprises”, “include”, “including”, “includes”, “have”, “has”, “having”, or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation “e.g.”, which derives from the Latin phrase “exempli gratia,” may be used to introduce or specify a general example or examples of a previously mentioned item, and is not intended to be limiting of such item. The common abbreviation “i.e.”, which derives from the Latin phrase “id est,” may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, micro-code, etc.) that runs on a processor such as a digital signal processor, which may collectively be referred to as “circuitry,” “a module” or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present inventive concepts. All such variations and modifications are intended to be included herein within the scope of present inventive concepts. Accordingly, the above disclosed subject matter is to be considered illustrative, and not restrictive, and the examples of embodiments are intended to cover all such modifications, enhancements, and other embodiments, which fall within the spirit and scope of present inventive concepts. Thus, to the maximum extent allowed by law, the scope of present inventive concepts are to be determined by the broadest permissible interpretation of the present disclosure including the examples of embodiments and their equivalents, and shall not be restricted or limited by the foregoing detailed description.

The invention claimed is:

1. A method of operating a communication device in a communications network that includes a network node, the method comprising:

receiving a notification message from the network node;

determining whether the network node will transmit control information that is associated with the communication device via a multicast control channel, MCCH, based on the notification message;

responsive to determining that the network node will transmit the control information, determining a time offset indicating an amount of time that will be between the notification message and the control information; and responsive to determining the time offset, determining whether to enter a lower power state based on the time offset, wherein the notification indicates that the control information will be transmitted via the MCCH after the time offset indicating the amount of time;

wherein the method further comprises receiving a system information block, SIB, from the network node, the SIB indicating a plurality of possible time offsets; and wherein determining the time offset comprises determining which one of the plurality of possible time offsets indicated by the SIB is the time offset based on the notification message.

2. The method of claim 1, further comprising:

transitioning from the low power state to an active state prior to receiving the notification message.

3. The method of claim 1, further comprising:

responsive to determining the time offset, entering the low power state based on the amount of time.

4. The method of claim 3, further comprising:

responsive to entering the low power state, transitioning from the lower power state to an active state prior to the amount of time elapsing; and receiving the control information via the MCCH.

5. The method of claim 1, wherein determining the time offset comprises determining the time offset based on the notification message.

6. The method of claim 1, further comprising:

receiving time offset configuration information from the network node.

7. The method of claim 6, wherein determining the time offset comprises determining the time offset based on the time offset configuration information and the notification message.

8. The method of claim 6, wherein receiving the time offset configuration information comprises receiving a preconfigured time offset, and wherein determining the time offset comprises determining the time offset to be the preconfigured time offset.

9. The method of claim 6, wherein receiving the time offset configuration information comprises receiving a system information block, SIB, from the network node including the time offset configuration information.

10. The method of claim 1, wherein the communications network is a $5^{th}$ generation, 5G, network, and wherein the network node is a radio access network, RAN, node.

11. A method of operating a network node in a communications network that includes a communication device, the method comprising:

determining a time offset indicating an amount of time that will be between a notification message transmitted to the communication device and control information transmitted via a multicast control channel, MCCH; and transmitting the notification message to the communication device indicating that the control information will be transmitted via the MCCH, wherein the notification indicates that the control information will be transmitted via the MCCH after the time offset indicating the amount of time;

wherein the method further comprises transmitting a system information block, SIB, to the communication device, the SIB indicating a plurality of possible time offsets; and wherein the notification message indicates which one of the plurality of possible time offsets indicated by the SIB is the time offset.

12. The method of claim 11, further comprising:

responsive to the amount of time having elapsed since transmitting the notification message, transmitting the control information via the MCCH.

13. The method of claim 11, further comprising:

responsive to determining the time offset, generating the notification message based on the time offset, the notification message indicating that the control information will be transmitted via the MCCH after the amount of time.

14. The method of claim 11, wherein the notification message comprises a physical downlink control channel, PDCCH, based signal or a sequence-based signal.

15. The method of claim 11, further comprising:

transmitting a system information block, SIB, to the communication device including time offset configuration information that indicates how to determine the time offset.

16. The method of claim 11, wherein the time offset is a slot offset between the notification message and the control information.

17. The method of claim 11, wherein the communications network is a $5^{th}$ generation, 5G, network, and wherein the network node is a radio access network, RAN, node.

18. A communication device in a communications network that includes a network node, the communication device comprising:

processing circuitry; and memory coupled to the processing circuitry and having instructions stored therein that are executable by the processing circuitry to cause the communication device to perform operations comprising to:

receive a notification message from the network node;

determine whether the network node will transmit control information that is associated with the communication device via a multicast control channel, MCCH, based on the notification message;

responsive to determining that the network node will transmit the control information, determine a time offset indicating an amount of time that will be between the notification message and the control information; and responsive to determining the time offset, determine whether to enter a lower power state based on the time offset, wherein the notification indicates that the control information will be transmitted via the MCCH after the time offset indicating the amount of time;

wherein the operations further comprise to receive a system information block, SIB, from the network node, the SIB indicating a plurality of possible time offsets; and wherein to determine the time offset comprises to determine which one of the plurality of possible time offsets indicated by the SIB is the time offset based on the notification message.

* * * * *